United States Patent [19]
Anderson et al.

[11] Patent Number: 6,118,480
[45] Date of Patent: *Sep. 12, 2000

[54] METHOD AND APPARATUS FOR INTEGRATING A DIGITAL CAMERA USER INTERFACE ACROSS MULTIPLE OPERATING MODES

[75] Inventors: Eric C. Anderson, San Jose; Steve Saylor, Morgan Hill; Amanda R. Mander, Palo Alto, all of Calif.

[73] Assignee: FlashPoint Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,667

[22] Filed: May 6, 1997

[51] Int. Cl.[7] .................................................. H04N 5/222
[52] U.S. Cl. ............................................................ 348/207
[58] Field of Search ..................................... 348/333, 334, 348/373, 375, 376, 552, 232, 233, 211, 231, 222, 207, 239; 358/906, 909.1

[56] References Cited

U.S. PATENT DOCUMENTS

| | | | |
|---|---|---|---|
| 4,935,809 | 6/1990 | Hayashi et al. | 358/527 |
| 4,982,291 | 1/1991 | Kurahashi et al. | 386/70 |
| 5,138,460 | 8/1992 | Egawa | 358/909.1 |
| 5,146,353 | 9/1992 | Isoguchi et al. | 358/909.1 |
| 5,335,072 | 8/1994 | Tanaka et al. . | |
| 5,404,316 | 4/1995 | Klingler et al. | 364/514 |
| 5,473,370 | 12/1995 | Moronaga et al. | 348/231 |
| 5,513,306 | 4/1996 | Mills et al. | 395/148 |
| 5,517,606 | 5/1996 | Matheny et al. | 395/156 |
| 5,553,277 | 9/1996 | Hirano et al. | 395/139 |
| 5,630,017 | 5/1997 | Gasper et al. | 395/173 |
| 5,742,504 | 4/1998 | Meyer et al. | 395/94 |
| 5,748,831 | 5/1998 | Kubo | 386/46 |
| 5,796,428 | 8/1998 | Matsumoto et al. | 348/231 |
| 5,819,103 | 10/1998 | Endoh et al. | 395/821 |
| 5,822,492 | 10/1998 | Wakui et al. | 386/107 |
| 5,845,166 | 12/1998 | Fellegara et al. | 348/64 |
| 5,861,918 | 1/1999 | Anderson et al. | 348/233 |
| 5,940,121 | 8/1999 | Mcintyre et al. | 348/207 |

FOREIGN PATENT DOCUMENTS

| | | | |
|---|---|---|---|
| 8223524 | 8/1996 | Japan | H04N 5/225 |
| 9220186 | 11/1992 | WIPO | H04N 5/262 |

*Primary Examiner*—Wendy Garber
*Assistant Examiner*—Aung S. Moe
*Attorney, Agent, or Firm*—Sawyer Law Group LLP

[57] ABSTRACT

A method and apparatus for integrating a user interface across multiple operating modes of a digital camera including a display. When the digital camera is placed into each one of the multiple operating modes, mode-specific items corresponding to that mode are displayed on the display. The digital camera includes a first button and a second button for interacting with the multiple operating modes, where the first button has a first orientation, and the second button has a second orientation. The method and apparatus includes mapping an aligned set of mode-specific items in the display to the orientation of the first button. After the mode-specific items are displayed, the user scrolls from one mode-specific item to the next in the aligned set by pressing the first button and the display indicates which of the mode-specific items is a currently active item. When a mode-specific item becomes the active item, additional information corresponding to the currently active item is displayed in the display in a location offset from the active item in a direction of orientation corresponding to that of the second button.

31 Claims, 11 Drawing Sheets

METHOD AND APPARATUS FOR INTEGRATING A DIGITAL CAMERA USER INTERFACE ACROSS MULTIPLE OPERATING MODES

FIELD OF THE INVENTION

The present invention relates generally to digital cameras, and more particularly to a method and apparatus for integrating a digital camera user interface across multiple operating modes.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images.

Digital camera user interfaces typically include a number of buttons or switches for setting the camera into one of the two modes and for navigating between images in play mode. One type of camera, for instance, includes two navigation buttons labeled "−" and "+", a mode button, a display button, a zoom button and a delete button. Play mode for this camera begins with a default screen displaying a full-sized individual image. Other images stored in the camera may then be displayed in a backward or forward sequence by pressing the "−" and "+" navigation buttons, respectively. Pressing the mode button during play mode causes four images to be displayed in a 2×2 array, and pressing the mode button again causes nine images to be displayed in a 3×3 array. The user can then "page" through screens of image arrays by pressing the navigation buttons, or the user can move from image to image in the arrays by first pressing the display button and then traversing across the images in the rows of the arrays using the navigation buttons. The user may have the full-sized image displayed of a chosen image by pressing the zoom button or can delete the image by pressing the delete button.

Although digital cameras that have both a record mode and a play mode are more versatile than digital cameras having only the record mode, two mode digital cameras suffer from several disadvantages associated with the camera's user interface. One disadvantage is that having only two modes means that either the camera only has a limited number of functions, or that several functions must be accessed in play mode since the record mode only has one function, capturing images. The disadvantages of having several functions in one mode is that the functions may have to be accessed through multiple levels of navigation screens, which complicates the operability of the camera.

Another disadvantage of conventional cameras is that the operation of user interface is non-intuitive, especially for the novice user. The user interface is non-intuitive because the operation of the user interface across different modes and/or navigation screens is inconsistent. Accessing most features in the two mode camera described above, for instance, requires that the user press the keys of the interface in a certain sequence. Each of these key sequences may be different depending on which play-mode navigation screen is displayed, the navigation screen showing individual images or the navigation screen showing arrays of images. For example, the function of the display button changes when the navigation screens change, and in some situations where the display button has been depressed, the mode button either becomes inoperable or the functionality of mode button becomes mutually exclusive with the functionality of the zoom button. Furthermore, because each navigation screen has a different key sequence, it is not obvious to the user how to exit that screen or how to choose a particular function. Thus, this type of user interface requires that the user memorize a different key sequence for each navigation screen before being able to effectively operate the camera.

A further disadvantage of conventional digital-camera user-interfaces is that the camera is capable of displaying only the images themselves, or a combination of an image and its image number. The user interface is either incapable of delivering further information regarding displayed images and the camera features, or accessing such information requires the user to enter another non-intuitive and complicated key sequence.

Accordingly, what is needed is an improved user interface for a multi-mode digital camera. The present invention addresses such a need.

SUMMARY OF THE INVENTION

The present invention provides a method and system for integrating a user interface across multiple operating modes of a digital camera wherein mode-specific items are displayed on a display when the digital camera is placed into a particular operating mode. The digital camera includes a first and a second navigation button for interacting with the operating modes, where the first navigation button has a first orientation and the second navigation button has a second orientation. The method includes the step of mapping an aligned set of mode-specific items in the display to the orientation of the first navigation button. After the mode-specific items are displayed, the user scrolls from one mode-specific item to the next in the aligned set by pressing the first navigation button, and the display indicates which of the mode-specific items is a currently active item. After a mode-specific item becomes the active item, additional information is displayed corresponding to the currently active item in the display in a location that is offset from the active item in a direction of orientation corresponding to that of the second button. In certain modes, the additional information includes a list of information items that is displayed in an alignment corresponding to the orientation of the second button, wherein the user can scroll through the list of information items using the second navigation button.

According to the method and apparatus disclosed herein, the digital camera is provided with more than two modes wherein the user can navigate, manipulate, and view camera contents using a consistent and intuitive spatial navigation technique. Providing more than one mode in which the user can view images and camera contents reduces the complexity of the user interface, and the spatial navigation frees the user from entering long key sequences. The user interface also automatically displays context sensitive information regarding the active item, which reduces the input required from the user and thereby increases the ease of use and operation of the digital camera.

DETAILED DESCRIPTION OF THE INVENTION

The present invention relates to an improvement in user interfaces of digital imaging devices, including digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a method and apparatus for integrating a digital camera user interface across multiple operating modes. According to the present invention, a method and system is provided for providing a digital camera with more than two modes and for providing a consistent and intuitive user interface across the multiple modes. The operation of the user interface across the multiple modes includes a user controlled horizontal interaction following by a reply from the camera of a vertical display of additional information in response to the user controlled horizontal interaction.

A digital camera architecture has been disclosed in co-pending U.S. patent application Ser. No. 08/666,241, entitled "A System And Method For Using A Unified Memory Architecture To Implement A Digital Camera Device," filed on Jun. 20, 1996. The Applicant hereby incorporates the co-pending application by reference, and reproduces portions of that application herein with reference to FIGS. 1–3 for convenience.

Figure 1:
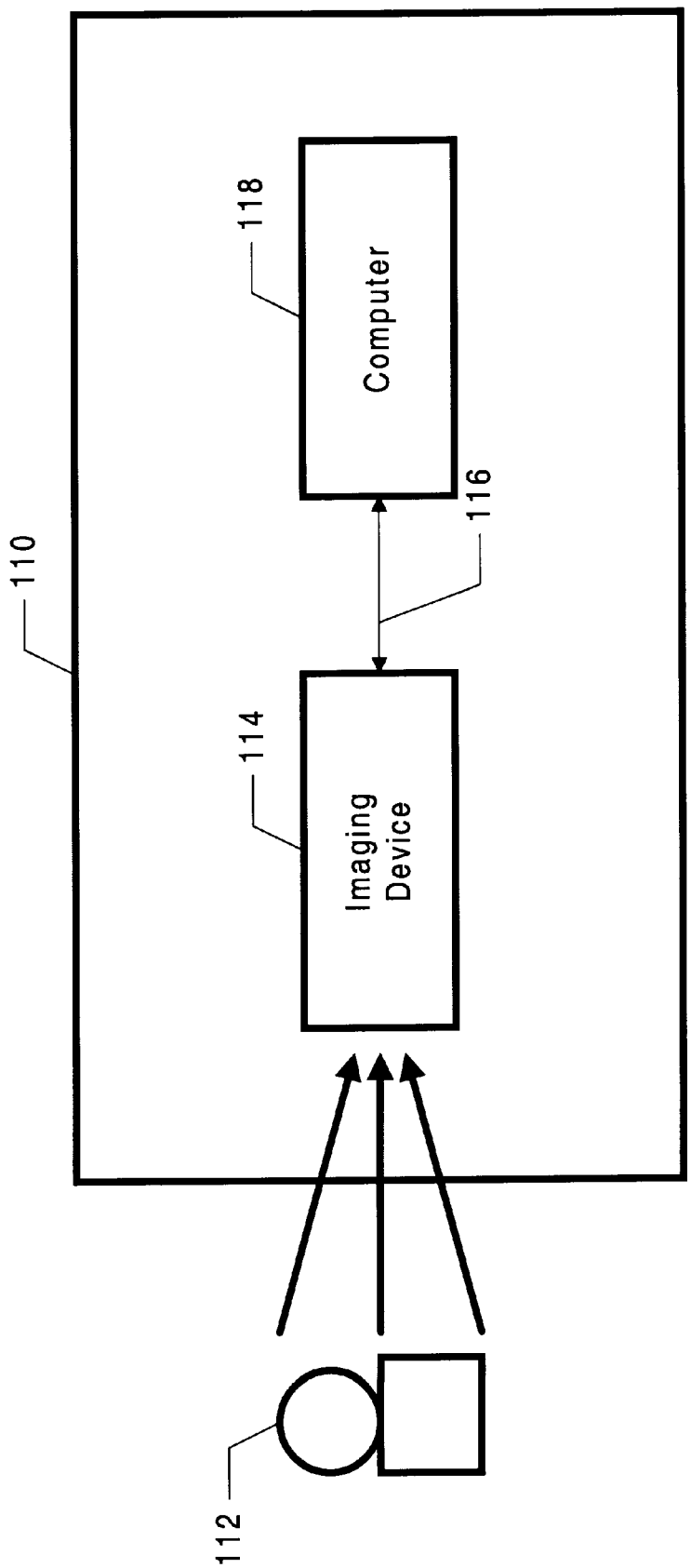
FIG. 1 is a block diagram of a digital camera that operates in accordance with the present invention.

Referring now to FIG. 1, a block diagram of a digital camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
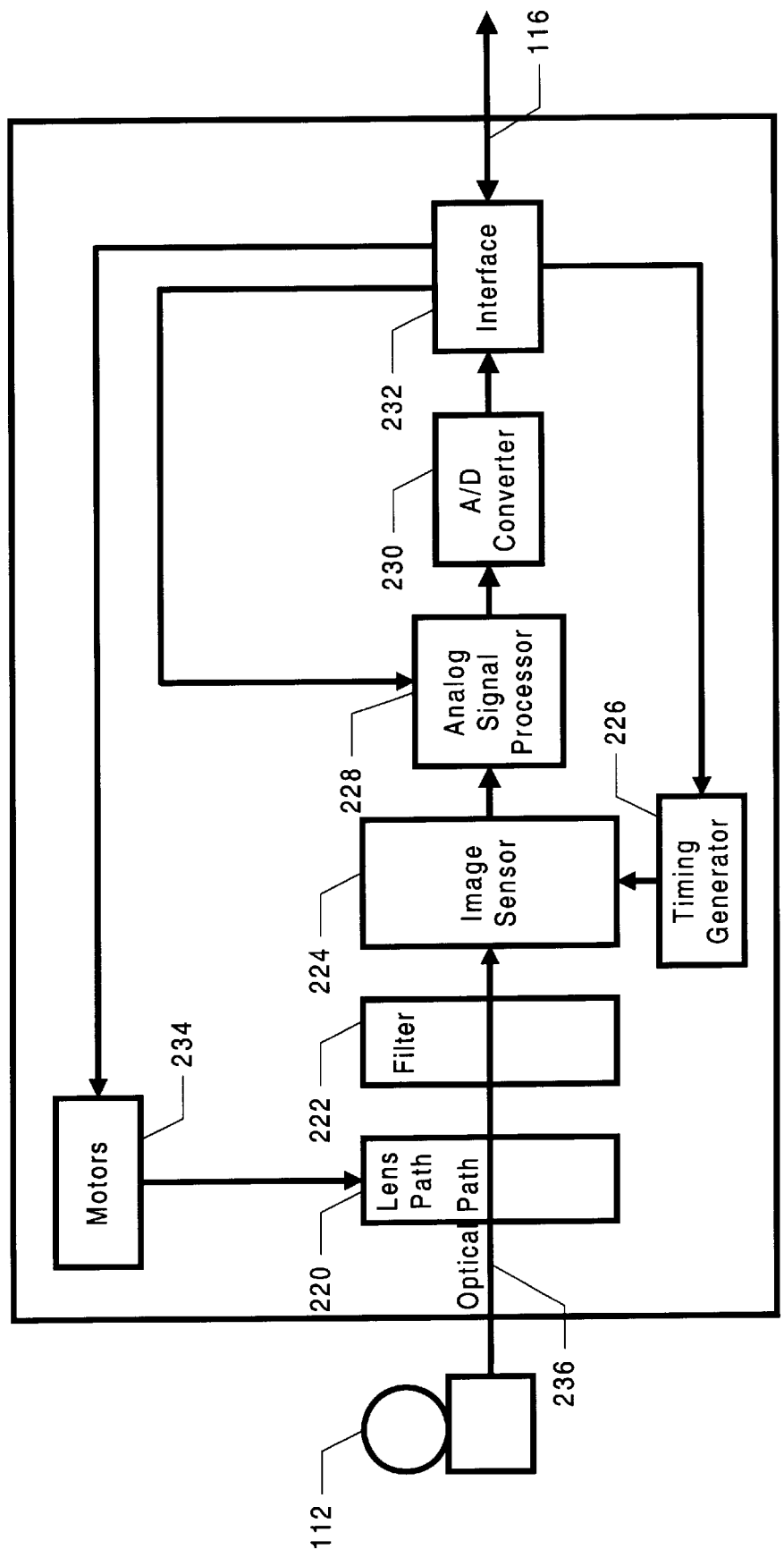
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. Pat. No. 5,496,106, entitled "A System and Method For Generating a Contrast Overlay as a Focus Assist for an Imaging Device," is incorporated herein by reference and provides a detailed discussion of the preferred elements of imaging device 114. Briefly, imaging device 114 captures an image of object 112 via reflected light impacting image sensor 224 along optical path 236. Image sensor 224, which is preferably a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
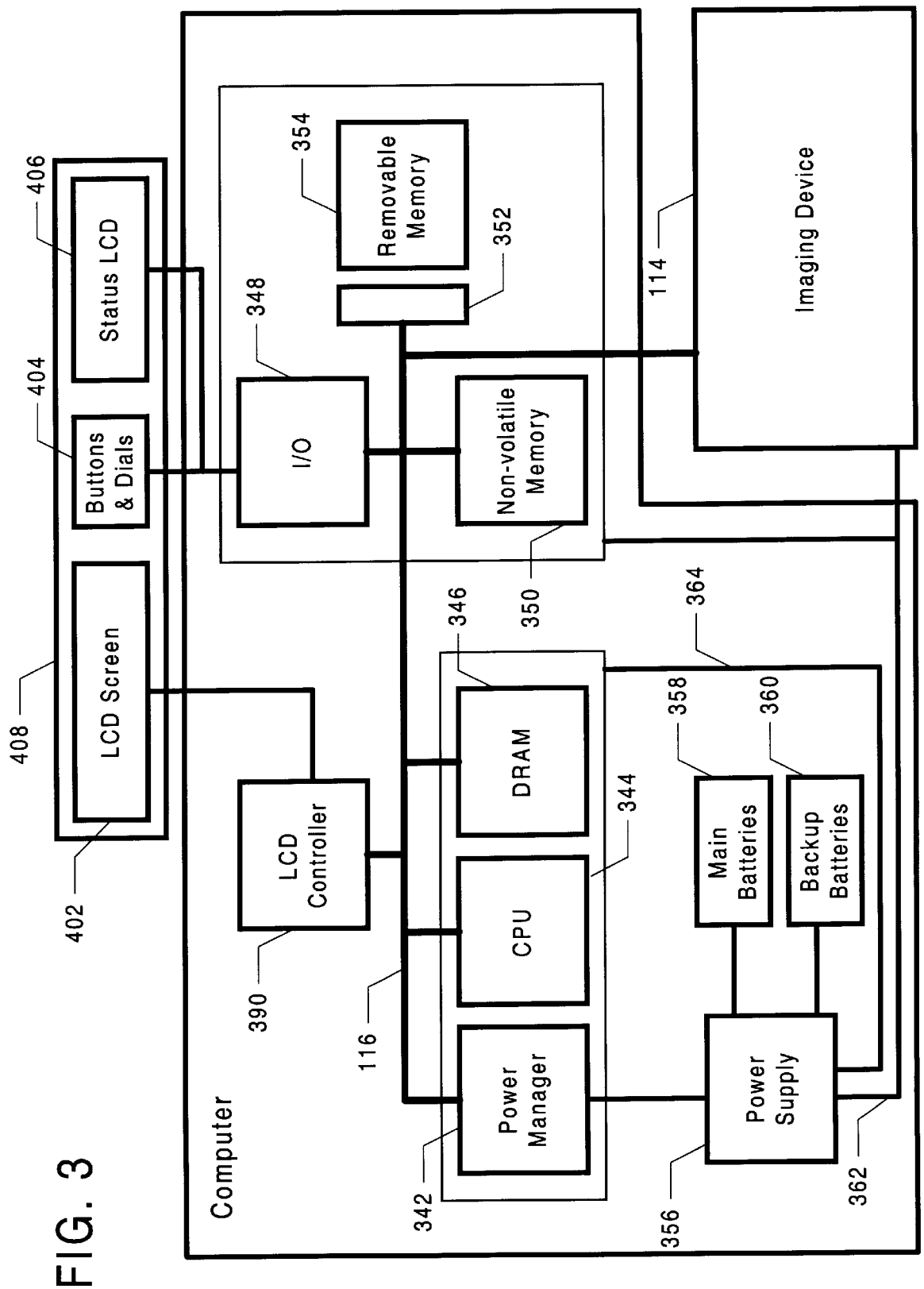
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
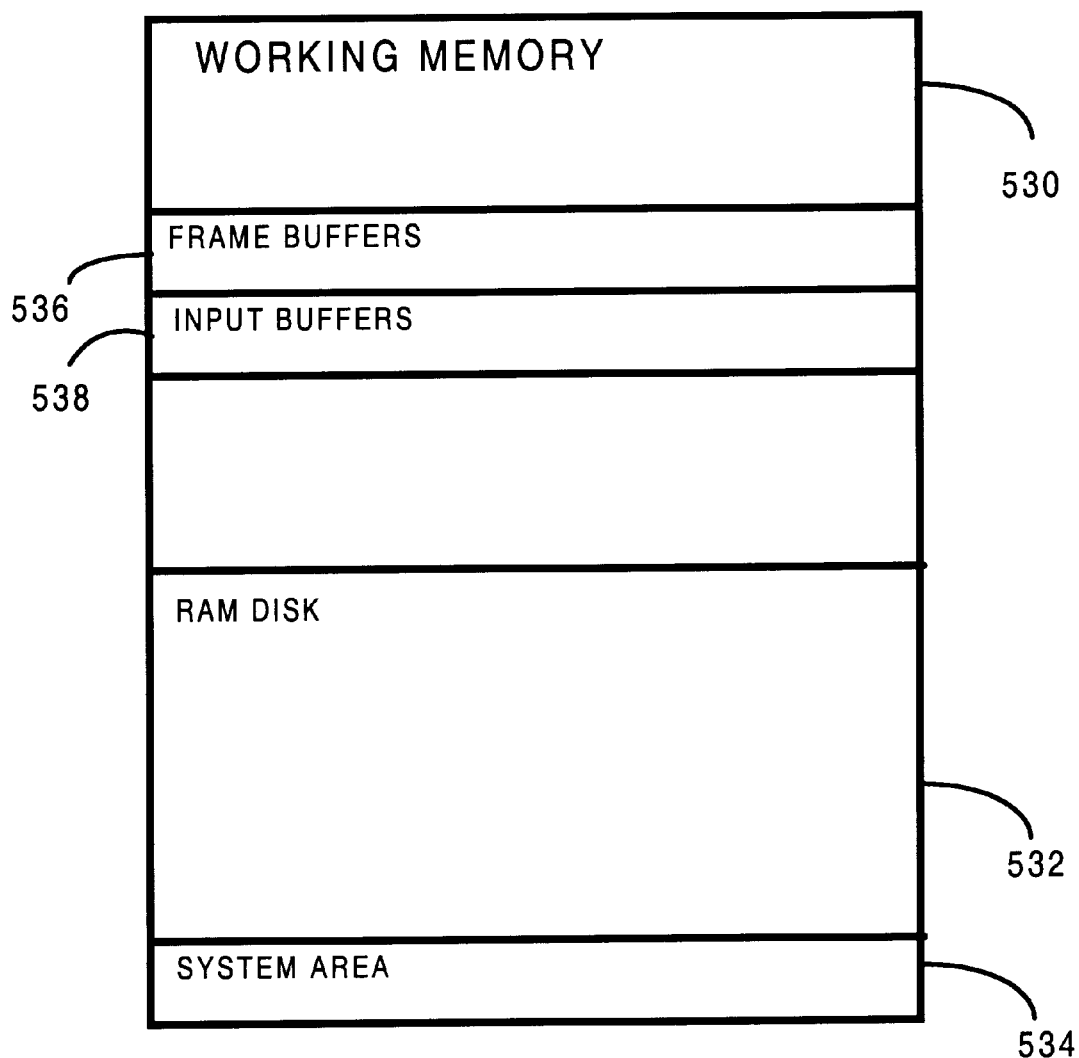
FIG. 4A is a memory map showing the preferred embodiment of the Dynamic Random-Access-Memory (DRAM).

Referring now to FIG. 4A, a memory map showing the preferred embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 402.

In a preferred embodiment, the conversion process is performed by a live view generation program, which is stored in non-volatile memory 350 and executed on CPU 344. However, the conversion process can also be implemented using hardware. Referring again to FIG. 3, during the execution of the live view generation program (not shown), the CPU 344 takes the raw image data from the input buffers 538 in CCD format and performs color space conversion on the data. The conversions process performs gamma correction and converts the raw CCD data into either a RGB or YCC color format which is compatible with the LCD screen 402. After the conversion, CPU 344 stores the image data in the frame buffers 536. The LCD controller 390 then transfers the processed image data from the frame buffers to the LCD screen 402 (via an optional analog converter) for display.

Figure 4B:
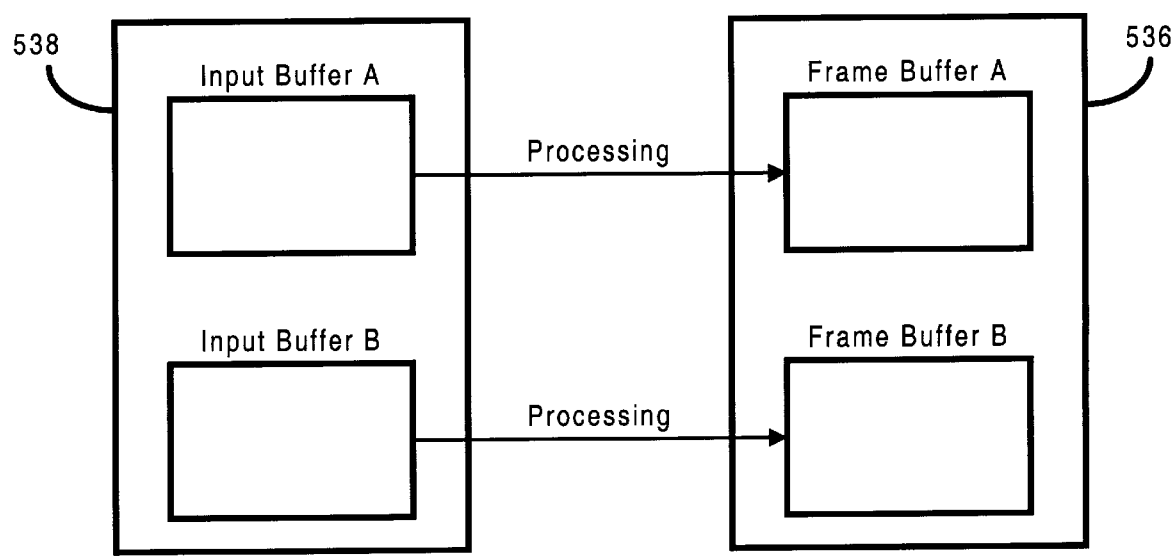
FIG. 4B is a diagram illustrating the input buffers and frame buffers.

Referring now to FIG. 4B, the contents of input buffers 538 and the frame buffers 536 are shown. In a preferred embodiment, both the input buffers 538 and the frame buffers 536 utilize two separate buffers, called ping-pong buffers, to improve the display speed of the digital camera and to prevent the tearing of the image in the display 402. As shown, input buffers 538 include an input buffer A and an input buffer B, and frame buffers 536 include a frame buffer A and a frame buffer B.

The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536. More specifically, while input buffer A is filling with image data, the data from input buffer B is processed and transmitted to frame buffer B. At the same time, previously processed data in frame buffer A is output to the LCD screen 402 for display. While input buffer B is filling with image data, the data from input buffer A is processed and transmitted to frame buffer A. At the same time, previously processed data in frame buffer B is output to the LCD screen 402 for display.

According to the present invention, the flexible architecture of the digital camera is used to provide and integrated camera user interface. More specifically, the present invention provides a method and system for integrating a digital-camera user-interface across multiple operating modes of the digital camera.

Figure 5A:
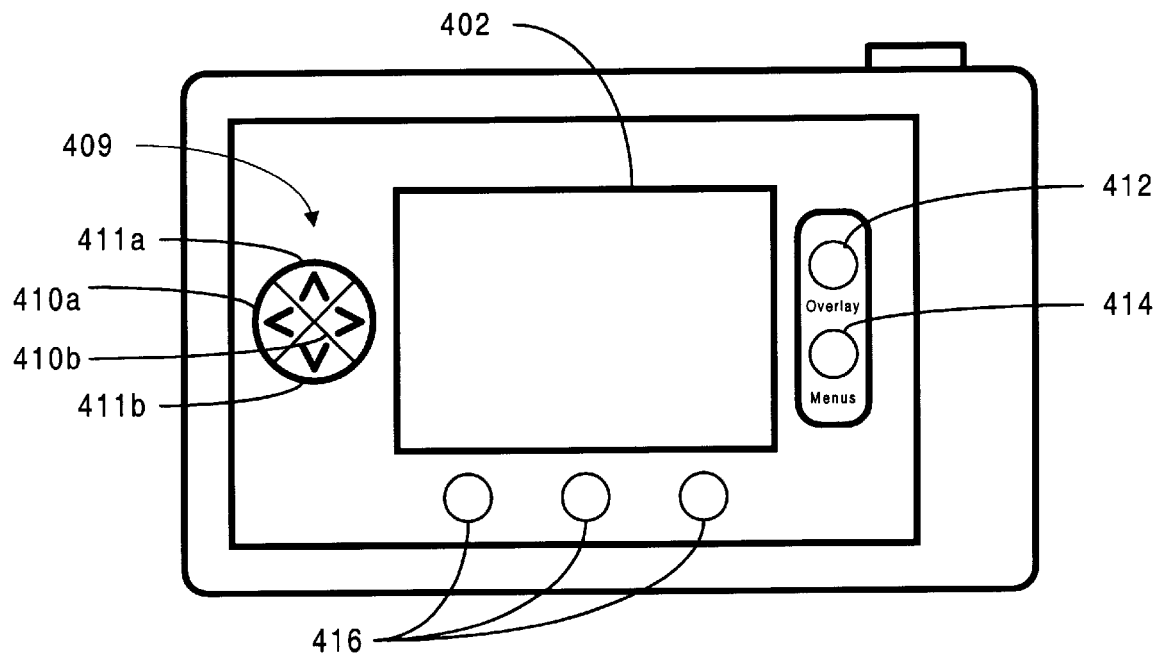
FIGS. 5A and 5B are diagrams depicting the back and top view, respectively, of a digital camera.
Figure 5B:
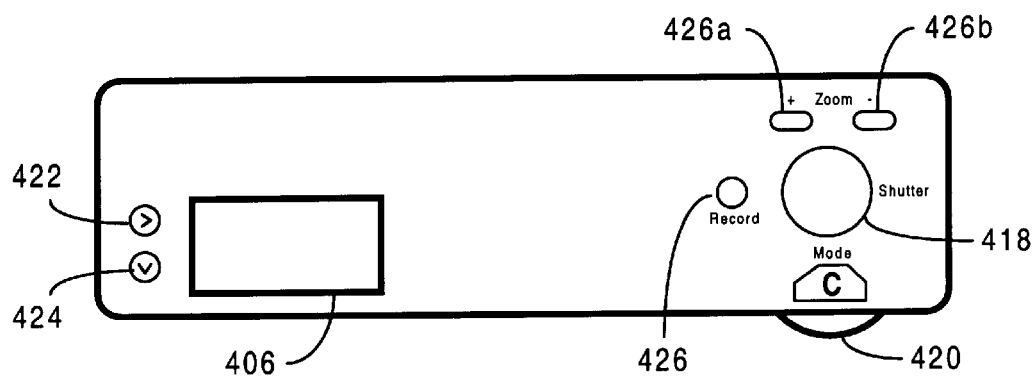

FIGS. 5A and 5B are diagrams depicting the hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

In one aspect of the present invention, the user interface 408 includes several different operating modes for supporting various camera functions. However, the modes relevant to this description are review mode, menu mode, and capture (record) mode. In review mode, the camera 100 supports the actions of reviewing camera contents, editing and sorting images, and printing and transferring images. In menu mode, the camera 100 allows the user to manipulate camera settings and to edit and organize captured images. In capture mode, the camera 100 supports the actions of preparing to capture an image, and capturing an image through the use of either the LCD screen 402 or the status LCD 406.

The user switches between the review, menu, and capture modes, using the mode dial 420. When the camera is placed into a particular mode, that mode's default screen appears in the LCD screen 402 in which a set of mode-specific items, such as images, icons, and text, are displayed. According to the present invention, the user may navigate through and access the contents and features of multiple camera modes using a consistent and intuitive user interface. Throughout various operating modes, the user interface includes a user controlled horizontal interaction following by a reply from the camera of a vertical display of information. Because the user interacts with the camera in each of various camera modes using the hardware buttons in a similar manner, as described herein, the learnability and usability of the camera are enhanced.

Figure 6:
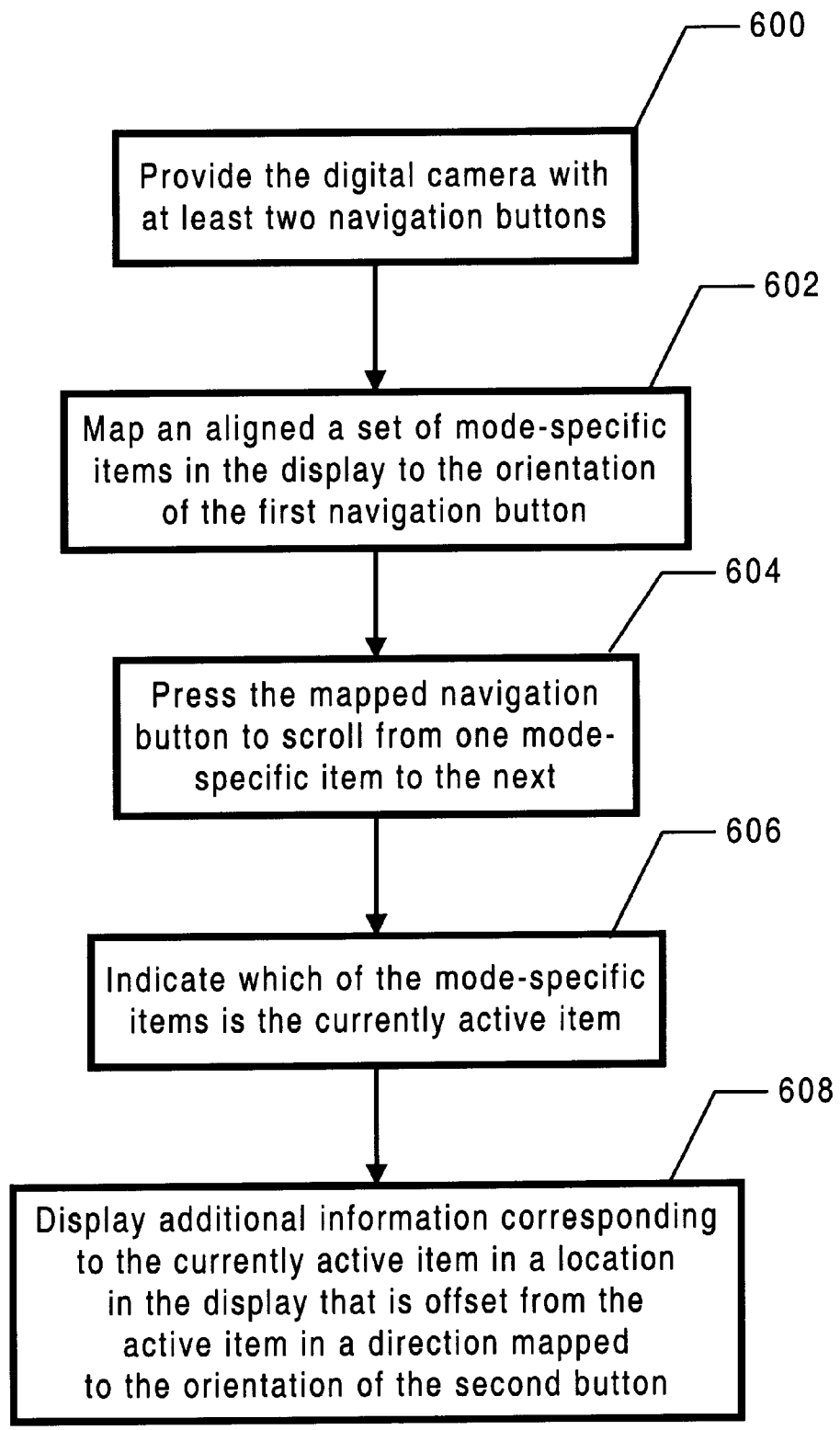
FIG. 6 is a flow chart illustrating the process of integrating a user interface across multiple operating modes of a digital camera according to the present invention.

Referring now to FIG. 6, a flow chart is shown illustrating the process of integrating a user interface across multiple operating modes of a digital camera in accordance with the present invention. Referring to both FIGS. 5A, and 6, the process begins by providing the user interface with at least two sets of navigation buttons in step 600. As shown in FIG. 5A, in a preferred embodiment of the present invention, the four-way navigation control button 409 provides the user interface with four buttons; left/right buttons 410*a* and 410*b*, which have a horizontal orientation, and up/down buttons 411*a* and 411*b*, which have a vertical orientation. In accordance with the present invention, the user uses the four way controller 409 in each of the various camera modes as a global navigational device in a way that provides the user with intuitive spatial orientation when navigating through the modes, as explained further below.

Referring again to FIG. 6, after the camera is placed into a particular mode, a set of mode-specific items are aligned in the LCD screen 402 so that the alignment of the mode-specific items maps to the natural spatial orientations of one set of navigation buttons on the four way controller in step 602.

Figure 7:
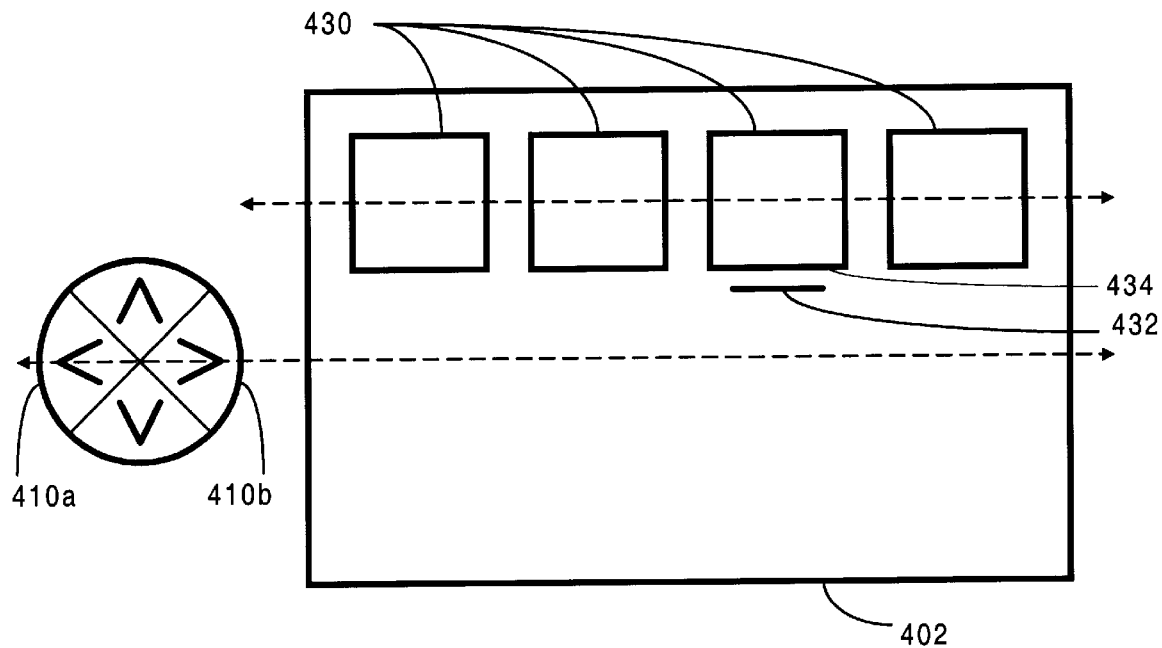
FIG. 7 is a block diagram illustrating a preferred embodiment of the present invention in which the alignment of the mode-specific items are mapped to the orientation of the horizontal navigation buttons.

FIG. 7 is a block diagram illustrating a preferred embodiment of the present invention in which the alignment of the mode-specific items 430 are mapped to the orientation of the horizontal navigation buttons 410*a* and 410*b*. As shown, mapping the alignment of the mode-specific items 430 to the orientation of the horizontal navigation buttons 410*a* and 410*b* causes the mode-specific items 430 to be displayed in a row(s) across the LCD screen 402. Rather than mapping the alignment of the mode-specific items 430 to the orientation of the horizontal navigation buttons 410, the mode-specific items 430 may also be mapped to the orientation of the vertical navigation buttons 411*a* and 411*b*. This would cause the mode-specific items to be displayed in a column in the LCD screen 402. Additionally, the alignment of the mode-specific items 430 may be mapped to other navigation button orientations (e.g. a diagonal orientation) if so desired.

Referring again to FIG. 6, after the mode-specific items 430 are displayed, the user can scroll or navigate from one mode-specific item 430 to the next by pressing the mapped navigation buttons in step 604. In FIG. 7 for example, pressing navigation button 410*b* causes a right scrolling action, and pressing navigation button 410A causes a left scrolling action. As the user scrolls through the mode-specific items 430, the camera displays an indication 432 of which one of the mode-specific items 430 is a currently active item 434 in step 606. This indication 432 may take the form of a highlight, a stationary or moving pointer, the active item 432 itself may blink, or a different type of mode-specific item may be shown to indicate an active/inactive status.

After a particular mode-specific item 430 has become the active item 434, additional information 436 corresponding to the active item is displayed in the LCD screen 402 in a location offset from the active item 434 in a direction mapped to the orientation of the second set of navigation buttons in step 608.

Figure 8:
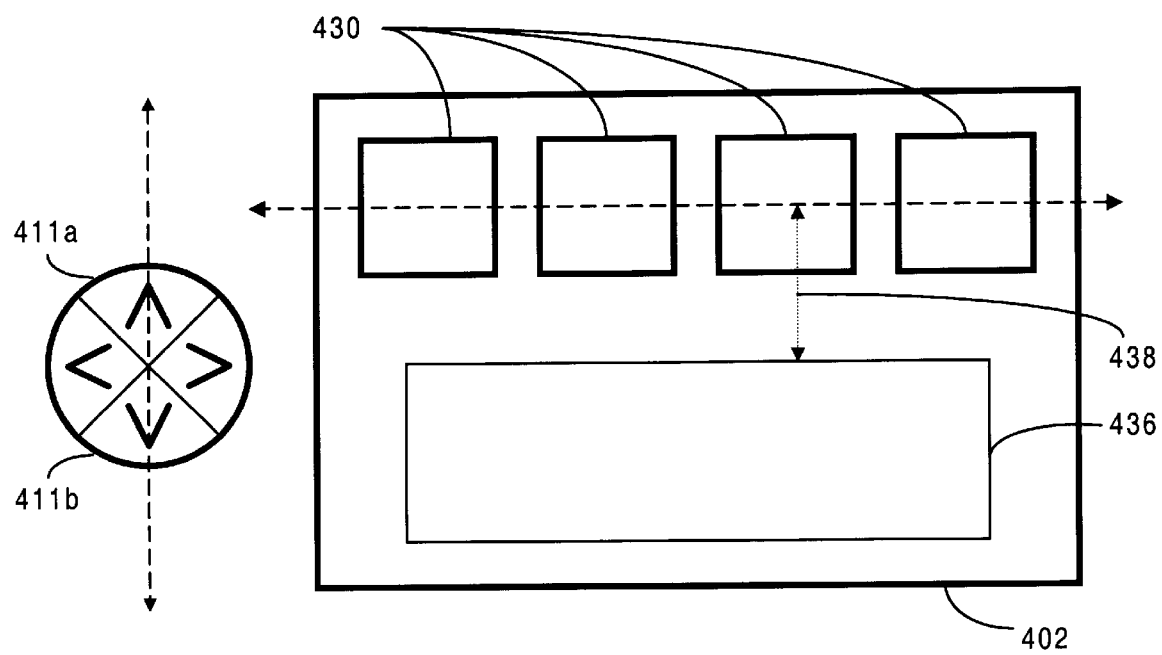
FIG. 8 is a block diagram of the user interface illustrating that when the mode-specific items are displayed horizontally, information corresponding to an active item is displayed vertically offset from the row of mode-specific items.

FIG. 8 is a block diagram of the user interface illustrating that when the mode-specific items 430 are displayed horizontally, the information 436 corresponding to the active item 434 is displayed in an area of the LCD screen 402 that is vertically offset 438 from the horizontal row of mode-specific items, and that the direction of offset 438 is parallel to the orientation of the vertical navigation buttons 411*a* and 411*b*.

According to the present invention, throughout the various operating modes of the camera, the integrated user interface maintains an interaction model in which the user scrolls horizontally to select an active mode-specific item, followed by a vertical display of additional information in the LCD screen 402 relating to the active item. And in certain modes, the additional information includes a list of information items that is displayed in an alignment corresponding to the orientation of the vertical navigation buttons 411*a* and 411*b*, wherein the user can scroll through the list of information items using those buttons.

By mapping both the modes of navigation and the display of mode information to the orientation of the navigation buttons 410 and 411 of the four way controller, the user essentially only has to learn one major mechanism for interacting with the multiple modes of the digital camera. That is, since the user interface interacts with each of the camera modes using only the four-way controller 409, the integrated user interface of the present invention significantly reduces the amount of key sequences the user must memorize in order to operate the camera. The preferred implementations of the review mode, the menu mode, and the capture mode are described below to further explain the integrated user interface of the present invention.

Figure 9:
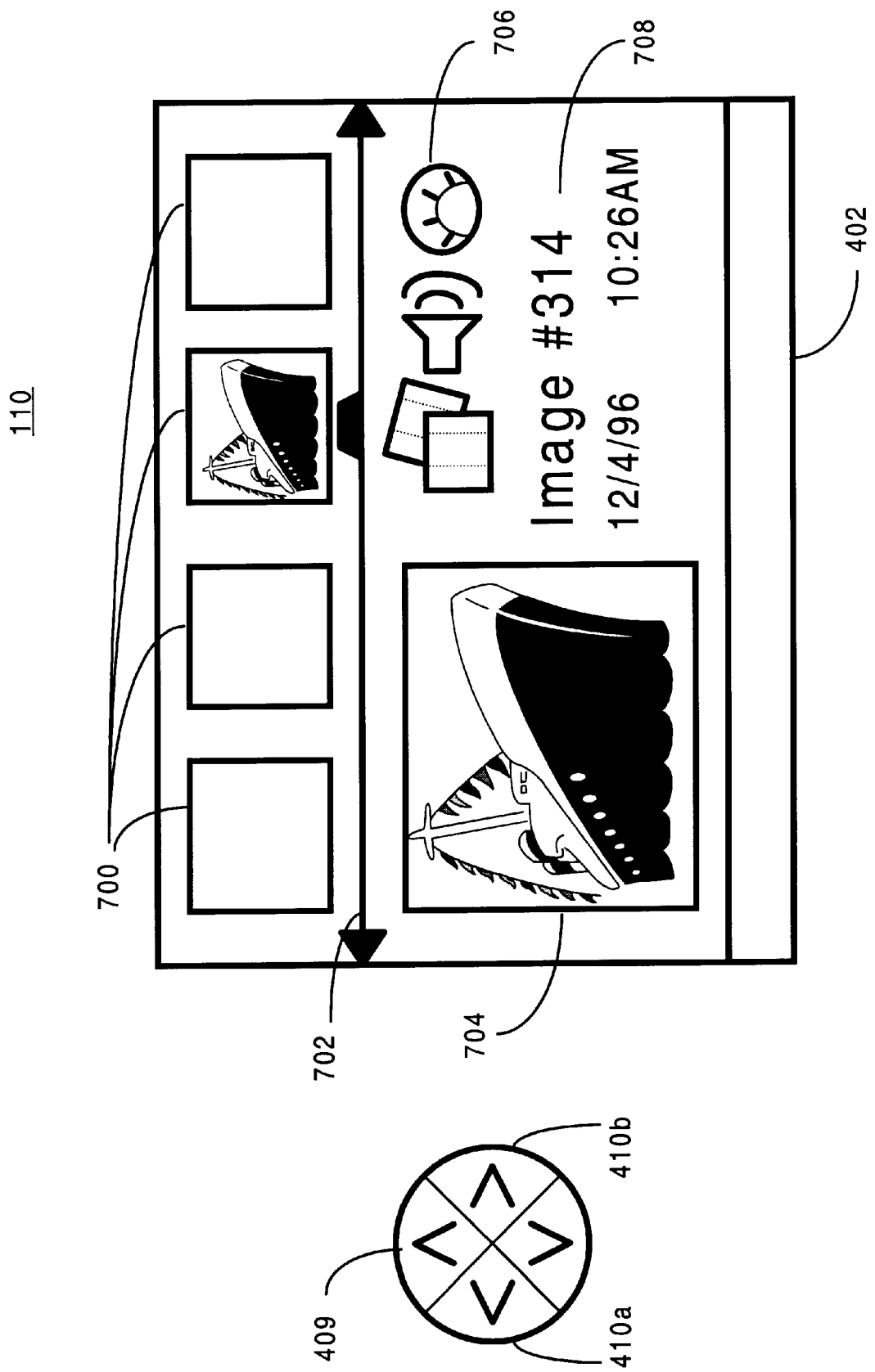
FIG. 9 is a diagram illustrating the operation and appearance of the integrated user interface during review mode in accordance with a preferred embodiment of the present invention.

Referring now to FIG. 9, a diagram illustrating the operation and appearance of the integrated user interface during review mode is shown in accordance with a preferred embodiment of the present invention. Moving the mode dial 420 (FIG. 5B) to access the review mode enables the user to view all the images in the camera along with specific attributes associated with each of the images.

The mode-specific items displayed across the LCD screen 402 in review mode are thumbnail images 700 that represent small-sized versions of the captured images. The thumbnails 700 are intended to serve as navigational aides rather than accurate representations of their images. As a result, the thumbnails 700 are cropped to a square size (50×50 pixels). A stationary selection arrow line 702 is used as both a navigational aid and to indicate which thumbnail is the currently active image.

In a preferred embodiment, the review screen layout displays four thumbnails 700 at a time and is based on a filmstrip metaphor which allows users to quickly move forward and backward among pictures chronologically. The user may navigate through the series of displayed thumbnails 700 in the LCD screen 402 using the four-way navigation control button 409. When the user holds down the left/right buttons 410, the thumbnails 700 are scrolled-off the LCD screen 402 and replaced by new thumbnails 700 representing other captured images to provide for fast browsing of the camera contents. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the active image.

When a thumbnail 700 becomes the active image, additional information corresponding to that image is automatically displayed vertically offset from the row of thumbnails 700 in the LCD screen 402. In a preferred embodiment, the additional information includes a large thumbnail 704 showing a larger view of the active thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 10A:
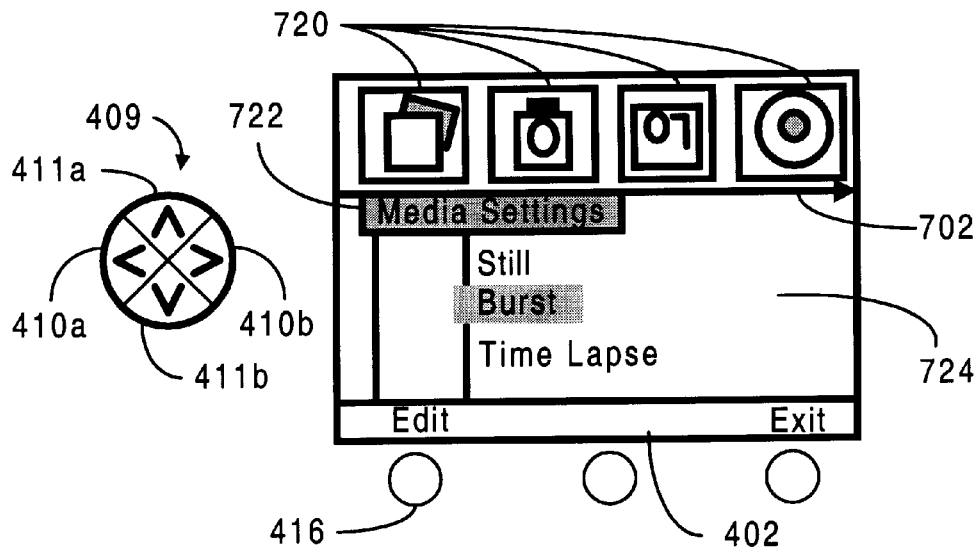
FIGS. 10A and 10B are diagrams illustrating the operation and appearance of the integrated user interface during menu mode in accordance with a preferred embodiment of the present invention.
Figure 10B:
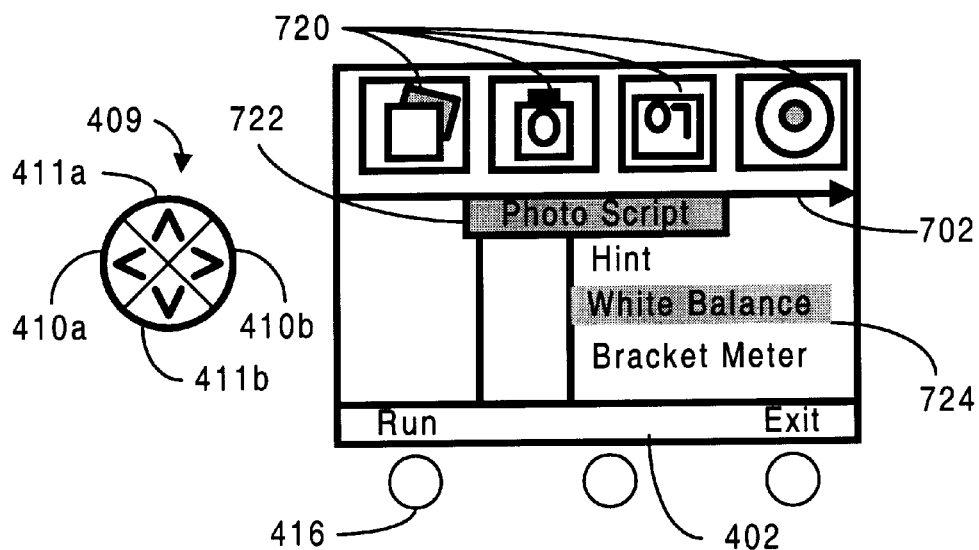

Referring now to FIGS. 10A and 10B, diagrams illustrating the operation and appearance of the integrated user interface during menu mode are shown in accordance with a preferred embodiment of the present invention. Menu mode may be accessed during other camera modes by pressing the menu button 414 or the soft keys 416 (see FIG. 5B) on the camera interface; and pressing the menu button 414 again exits the mode. Similar to the review mode, the menu mode is divided into horizontal and vertical elements, and is also capable of supporting various levels of sub menus.

The menu-mode is capable of displaying multiple levels of navigation in the menu structure. In the first level of menus, the mode-specific items displayed in a row across the LCD screen 402 are graphical icons 720 representing menu categories for camera and image settings. In accordance with the integrated user interface of the present invention, the user may first select a menu category by navigating horizontally across the LCD screen 402 using the horizontal navigation control button 410, and then select a menu item by navigating vertically in the display using the vertical navigation control buttons 411.

When navigating horizontally from icon to icon 720 in the LCD screen 402, arrows on selection arrow line 702 indicate to the user which direction they can navigate. In the example shown in FIGS. 10A and 10B, the right arrow underneath the icon row indicates that the user can only scroll right and that more icons 720 are available past the fourth icon 720 in the row. In a preferred embodiment, the icons are stationary in the LCD screen 402, and as the user presses the left/right buttons 410, each icon 720 in turn becomes the active icon. If the fourth icon 720 is active and the user presses the right navigation button 410b, then the display would "page" to reveal the next set of icons 720. In an alternative embodiment, the icons 720 scroll on and off the LCD screen 402 as the user presses the left/right buttons 410.

When an icon becomes active, the icon 720 is highlighted, a text label 722 for the icon is displayed under the icon 720, and a list of menu items corresponding to camera features is displayed below the text label 722 in an alignment mapped to the orientation of the up/down buttons 411. FIG. 10A shows an example menu displayed below the text menu corresponding the first icon in the row. After a menu is displayed, the user can then vertically scroll through the list of menu items by pressing the up/down buttons 411, causing a highlight to move up and down the feature list. FIG. 10B illustrates the result of the user scrolling to the second icon in the row, which causes the menu for that icon to be displayed.

In a preferred embodiment, sub-levels of menus may be displayed if necessary by pressing other buttons on the camera, such as a soft key 416. When a secondary level of menus is available, text such as "edit", "next", or "more" may appear above a soft key 416, as shown. By pressing the soft key 416 under this text, a secondary menu will be displayed in the same fashion as the first level. Pressing the "edit" soft key again in the second level menu, brings up another level, and so on.

Figure 11A:
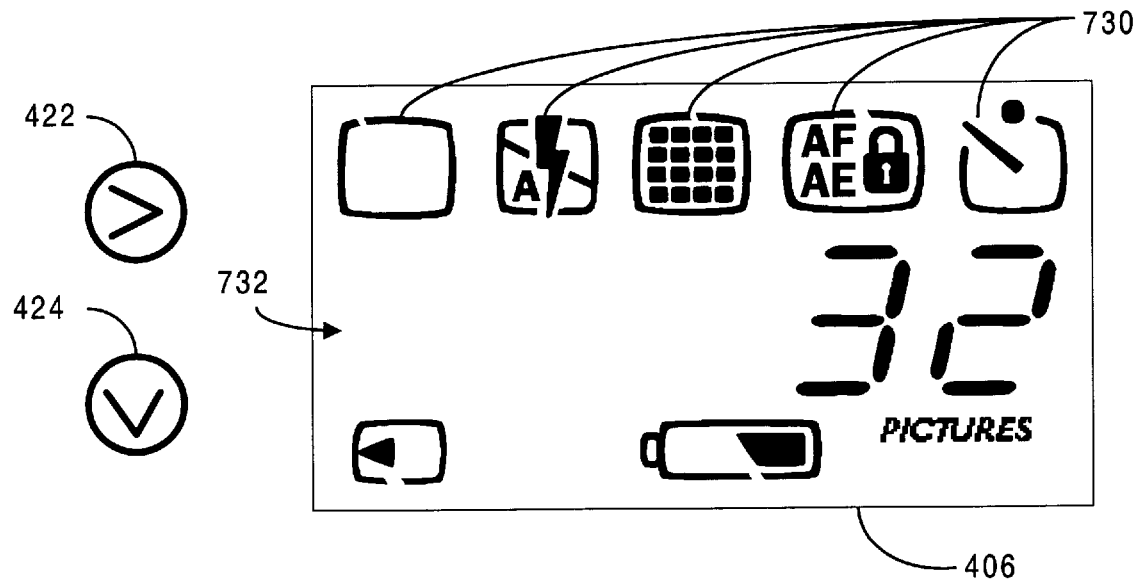
FIGS. 11A and 11B are diagrams illustrating the operation and appearance of the integrated user interface during capture mode in accordance with a preferred embodiment of the present invention.
Figure 11B:
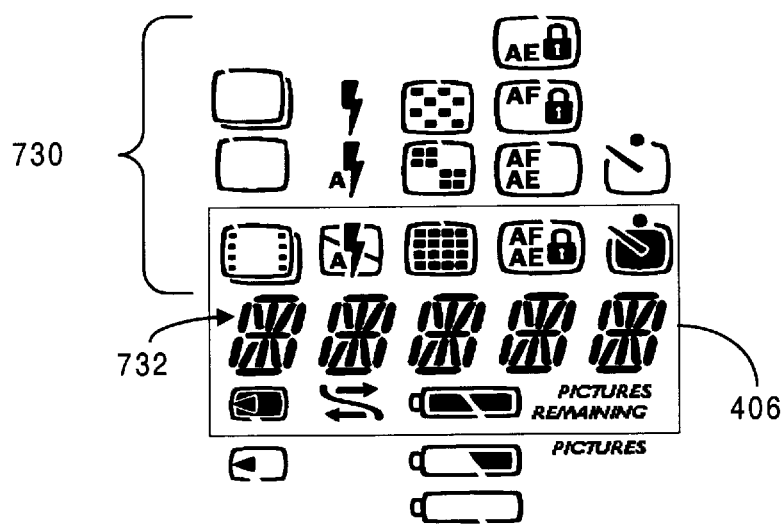

Referring now to FIGS. 11A and 11B, diagrams illustrating the operation and appearance of the integrated user interface during capture mode are shown in accordance with a preferred embodiment of the present invention. Because most of color LCD technology in use today may have disadvantages in terms of power consumption and viewability, the present invention includes the status LCD 406 in the user interface 110 to act as a supplementary capture interface to compensate for the restrictions of the LCD screen 402. The optional status LCD 406 provides image capture and feature setting capability without using the color LCD screen 402.

Similar to the modes described above, the status LCD 406 in capture mode is divided into horizontal and vertical elements. Referring to FIG. 11A, the horizontal mode-specific items displayed across the status LCD 406 are icons 730 that enable the user to set the following preferred set of features; image capture type, flash, image compression level, exposure/focus lock, and self timer. In accordance with the integrated user interface, the user navigates through the status LCD 406 using a horizontal scroll button 422 and a vertical select button 424, although the four-way controller 409 may optionally be used in an alternate embodiment.

To navigate the status LCD 406, the user presses horizontal scroll button 422 to activate individual icons across the top row with each press. Active icons are preferably identified by blinking on and off. To modify the current setting associated with an active icon 730 the user presses the vertical select button 424 to toggle the setting to the desired state. To reinforce the meaning of the active icon state, an alphanumeric display 732 is used to spell out the current setting of the active icon. Each time the user presses the vertical select button 424, the state of the active icon state changes, and the alphanumeric display 732 displays text corresponding to that state.

FIG. 11B is diagram illustrating the possible icon 730 states for the status LCD 406 in a preferred embodiment of the present invention. The first icon 730 in the icon row represents the image capture type settings, and the possible states shown from top to bottom correspond to burst, still, or time-lapse image capture type. The second icon 730 represents the flash setting, and the possible states shown are on, auto, and off. The third icon 730 represents the image compression level, and the possible states shown are good, better, and best. The fourth icon 730 represents the exposure/focus lock setting, and the possible states shown are auto exposure (AE) lock, auto focus (AF) lock, AF/AE active, and AF/AE lock. And the last icon 730 in the icon row represents the setting for the self timer, and the possible states shown are off and on.

A method and system for integrating a digital camera user interface across multiple operating modes has been disclosed. Throughout the various operating modes of the camera, the integrated user interface maintains an interaction model in which the user scrolls horizontally to select a mode-specific item, followed by a vertical display of additional information in the LCD screen relating to that selected item. Using the integrated user interface of the present invention, the user can navigate, manipulate, and view camera contents using a consistent and intuitive spatial navigation technique that frees the user from entering long key sequences, and thereby increases the ease of use and operation of the digital camera.

Although the present invention has been described in accordance with the embodiments shown, one of ordinary skill in the art will readily recognize that there could be variations to the embodiments and those variations would be within the spirit and scope of the present invention. For example, the integrated user interface also applies to cameras having only two modes, but that have multiple navigation screens within the "play mode" Accordingly, many modifications may be made by one of ordinary skill in the art without departing from the spirit and scope of the appended claims.

What is claimed is:

1. A method for integrating a user interface across multiple operating modes of a digital camera having a display and a first button and a second button, the first button having a first orientation and the second button having a second orientation, the method comprising the steps of:

a) placing the digital camera into a first operating mode;
   b) displaying mode-specific items in the display such that all the mode-specific items are displayed in an alignment that is mapped to the orientation of the first button to create a mapped navigation button;
   c) scrolling the mode-specific items by pressing the mapped navigation button wherein the display indicates which of the mode-specific items is a currently active item, and wherein the mode-specific items are scrolled-off the display and replaced by new mode-specific items;
   d) displaying additional information corresponding to the currently active item in the display in a location that is offset from the active item in a direction of orientation corresponding to that of the second button; and
   e) placing the digital imaging device into a second operating mode and repeating steps b) through d) such that the user navigates both the first and second operating modes in substantially the same manner, thereby improving ease of use of the digital imaging device.

2. The method as in claim 1 wherein when the camera is placed into first mode, the additional information includes a list of information items, the method further including the steps of:

d1) displaying the list of information items in an alignment corresponding to the orientation of the second button; and
   d2) scrolling through the list of information items by pressing the second button.

3. The method as in claim 2 wherein step c) further includes the step of:

c1) providing the first button with left and a right navigation buttons having a horizontal orientation.

4. The method as in claim 3 wherein step d) further includes the step of:

providing the second button with up and down navigation buttons having a vertical orientation.

5. The method as in claim 4 further including the step of displaying a set of menu icons as the mode-specific items while in the first operating mode.

6. The method as in claim 5 further including the step of pressing the down navigation button to scroll through the list of information items corresponding to the currently active item.

7. The method as in claim 4 further including the step of displaying a set of thumbnail images corresponding to captured images as the mode-specific items when the digital camera is placed into the second operating mode.

8. The method as in claim 7 further including the step of displaying a large thumbnail as part of the additional information.

9. The method as in claim 8 further including the step of including as part of the additional information, one or more media types, a name, and a capture date and time for the active image, wherein the media types include a still image, a time lapse image, a burst image, and sound.

10. The method as in claim 4 further including the step of providing a third operating mode wherein when the digital camera is placed into the third operating mode, a set of icons representing camera features are displayed as the mode-specific items.

11. The method as in claim 10 further including the step of changing a particular one of the camera features by pressing one of the up and down navigation buttons to change a state of the corresponding icon.

12. A digital camera having an integrated user interface; comprising:

an image device for capturing image data;
   a memory coupled to the imaging device for storing the image data as captured images;
   a display;
   a first set of navigation buttons having a first orientation;
   a second set of navigation buttons having a second orientation;
   multiple operating modes for supporting a plurality of digital camera functions; and
   a processor coupled to the image device, the memory, the display and to the first and second set of navigation buttons for controlling operation of the digital camera and the multiple operating modes, such that at least two of the operating modes are navigated in substantially the same manner, wherein the processor includes,
   means responsive to the digital camera being placed into the at least two operating modes for displaying mode-specific items in the display such that all the mode-specific items are displayed in an alignment that is mapped to the orientation of the first set of navigation buttons,
   means for scrolling the mode-specific items in response to a user pressing the first set of navigation buttons, wherein an indication in the display indicates which of the mode-specific items is a currently active item, and wherein the mode-specific items are scrolled-off the display and replaced by new mode-specific items, and
   means for displaying additional information corresponding to the currently active item in the display in a location that is offset from the active item in a direction of orientation corresponding to that of the second set of navigation buttons.

13. The digital camera of claim 12 wherein when the digital camera is placed into a first operating mode, the additional information includes a list of information items, wherein the processor further includes, means for displaying the list of information items in an alignment corresponding to the orientation of the second set of navigation buttons; and
   means for scrolling through the list of information items in response to the user pressing the second navigation button.

14. The digital camera as in claim 13 wherein the first set of navigation buttons have a horizontal orientation and the second set of navigation buttons have a vertical orientation.

15. The digital camera as in claim 14 wherein in the first operating mode the mode-specific items comprise icons representing menu categories.

16. The digital camera as in claim 15 wherein as the user presses the first set of navigation buttons to scroll through the set of icons, each of the icons is highlighted, and becomes an active icon in response to the user pressing one of the second set of navigation buttons.

17. The digital camera as in claim 16 wherein when the digital camera is placed into a second operating mode the mode-specific items comprise thumbnails representing captures images.

18. The digital camera as in claim 17 wherein when the digital camera is placed into the second operating mode the additional information includes a large thumbnail representing of the currently active item.

19. The digital camera as in claim 18 wherein when the digital camera is placed into a third operating mode the mode-specific items comprise icons representing camera feature settings.

20. The digital camera as in claim 19 wherein when the digital camera is placed into the third operating mode the additional information includes text representing the feature setting of the currently active item.

21. The digital camera as in claim 20 wherein the digital camera further includes a status display wherein when the digital camera is placed into the third operating mode the mode-specific items and the additional information are displayed in the status display.

22. A method for integrating a user interface across multiple operating modes of a digital imaging device, the digital imaging device including a display, and a navigational device including first and second control buttons for controlling the display, the method comprising the steps of:
   a) placing the digital imaging device into a first operating mode;
   b) displaying a plurality mode-specific items, such that all the mode-specific items are displayed in a horizontal row across the display;
   c) providing a user controlled horizontal interaction whereby the user presses the first control button to horizontally scroll the plurality of mode-specific items in the row, which activates individual mode-specific items with each press, wherein the mode-specific items are scrolled-off the display and replaced by new mode-specific items; and
   d) providing a vertical response from the digital imaging device wherein in a position on the display vertically offset from the plurality mode-specific items, the digital imaging device displays an optional combination of graphics and text corresponding to the activated mode-specific item; and
   e) placing the digital imaging device into a second operating mode and repeating steps b) through d) such that the user navigates both the first and second operating modes in substantially the same manner, thereby improving ease of use of the digital imaging device.

23. A method as in claim 22 wherein step b) further includes the step of:
   b1) displaying a plurality of thumbnail images as the mode-specific items.

24. A method as in claim 23 wherein step d) further includes the step of:
   d1) displaying a large thumbnail image corresponding to the activated mode-specific item.

25. A method as in claim 24 wherein step d) further includes the step of:
   d2) displaying text of an image name and date corresponding to the activated mode-specific item.

26. A method as in claim 22 wherein step b) further includes the step of:
   b1) displaying a plurality of icons as the mode-specific items.

27. A method as in claim 26 wherein step d) further includes the step of:
   d1) displaying a text feature list corresponding to the activated mode-specific item.

28. A method as in claim 26 wherein step d) further includes the step of:
   d1) displaying text corresponding to a state of the activated mode-specific item.

29. A digital camera having an integrated user interface; comprising:
   an image device for capturing image data;
   a memory coupled to the imaging device for storing the image data as captured images;
   a first set of navigation buttons having a first orientation and a second set of navigation buttons having a second orientation for controlling navigation;
   a processor coupled to the image device, the memory, and to the first and second set of navigation buttons for controlling operation of the digital camera including a first operating mode and a second operating mode;
   a primary display coupled to the processor, the primary display being divided into a first set of elements where all of the elements are aligned with the orientation of the first set of navigation buttons, and a second element displayed offset from the first set of elements in a direction aligned with the orientation of the second set of navigation buttons, wherein when the camera is in the first operating mode, a user navigates the first set of elements using the first set of navigation buttons; and
   a status display coupled to the processor, the status display being divided into a third set of elements and a fourth element, wherein all the elements in the third set are aligned with the orientation of the first set of navigation buttons and the fourth element is displayed offset from the third set of elements in a direction of orientation corresponding to that of the second set of navigation buttons, wherein when the camera is in the second operating mode, the user navigates the third set of elements using the first set of navigation buttons, whereby navigation of the second operating mode in the status display is substantially similar to navigation of the first operating mode in the primary display.

30. The digital camera as in claim 29 further including a first status control button and a second status control button wherein the user navigates the status display using the first and second status control buttons.

31. A method for integrating a user interface across multiple operating modes of a digital camera, the digital camera including a display, and a navigational device including first and second buttons for controlling the display, the first button having a first orientation and the second button having a second orientation, the method comprising the steps of:

a) providing the digital camera with a first mode for capturing images;
b) providing the digital camera with a second mode and a third mode that are navigated by a user in substantially the same manner by;
c) displaying a set of menu categories on the display in the second mode by
   i) displaying all of the menu categories in alignment with the orientation of the first button,
   ii) scrolling the menu categories in response to the user pressing the first button, wherein the display indicates which of the menu categories is a currently active menu category, wherein the menu categories are scrolled-off the display and replaced by new menu categories, and
   iii) displaying additional information corresponding to the currently active menu category in the display in a location that is offset from the menu categories in a direction of orientation corresponding to that of the second button; and
d) playing back a set of thumbnail images on the display in the third mode by
   i) displaying all of the thumbnail images in alignment with the orientation of the first button,
   ii) scrolling the thumbnail images in response to the user pressing the first button, wherein the display indicates which of the thumbnail images is a currently active thumbnail image, wherein the thumbnail images are scrolled-off the display and replaced by new thumbnail images, and
   iii) displaying additional information corresponding to the currently active thumbnail image in the display in a location that is offset from the thumbnail images in a direction of orientation corresponding to that of the second button, wherein operation of the third mode is consistent with operation of the second mode to thereby increase ease of use of the digital camera.

* * * * *

US006118480C1

(12) EX PARTE REEXAMINATION CERTIFICATE (8165th)
United States Patent
Anderson et al.

(10) Number: US 6,118,480 C1
(45) Certificate Issued: Apr. 19, 2011

(54) METHOD AND APPARATUS FOR INTEGRATING A DIGITAL CAMERA USER INTERFACE ACROSS MULTIPLE OPERATING MODES

(75) Inventors: Eric C. Anderson, San Jose, CA (US); Steve Saylor, Morgan Hill, CA (US); Amanda R. Mander, Palo Alto, CA (US)

(73) Assignee: Flashpoint Technology, Inc., San Jose, CA (US)

Reexamination Request:
No. 90/010,673, Oct. 19, 2009

Reexamination Certificate for:
Patent No.: 6,118,480
Issued: Sep. 12, 2000
Appl. No.: 08/851,667
Filed: May 6, 1997

(51) Int. Cl.
*H04N 1/32* (2006.01)
*H04N 5/232* (2006.01)

(52) U.S. Cl. .................. 348/207.99; 348/42; 348/47
(58) Field of Classification Search ............ 348/207.99
See application file for complete search history.

(56) References Cited

U.S. PATENT DOCUMENTS

| | | |
|---|---|---|
| 2,289,555 A | 7/1942 | Simons |
| 3,814,227 A | 6/1974 | Hurd, III et al. |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,125,111 A | 11/1978 | Hudspeth et al. |
| 4,158,208 A | 6/1979 | Dischert |
| 4,172,327 A | 10/1979 | Kuehn et al. |
| 4,195,317 A | 3/1980 | Stratton |
| 4,234,890 A | 11/1980 | Astle et al. |
| 4,325,080 A | 4/1982 | Satoh |
| 4,337,479 A | 6/1982 | Tomimoto et al. |
| 4,347,618 A | 8/1982 | Kavouras et al. |
| 4,364,650 A | 12/1982 | Terashita et al. |
| 4,403,303 A | 9/1983 | Howes et al. |
| 4,416,282 A | 11/1983 | Saulson et al. |
| 4,456,931 A | 6/1984 | Toyoda et al. |
| 4,466,230 A | 8/1984 | Osselaere et al. |
| 4,470,067 A | 9/1984 | Mino |

(Continued)

FOREIGN PATENT DOCUMENTS

| | | |
|---|---|---|
| EP | 0122094 A2 | 10/1984 |
| EP | 0421769 A2 | 4/1991 |
| EP | 0422447 A2 | 4/1991 |

(Continued)

OTHER PUBLICATIONS

Foley et al., *Computer Graphics—Principles and Practice, Second Edition in C*, Addison–Wesley Publishing Company, New York, 1996, pp. 132–137, 506–509, 755–759.

(Continued)

*Primary Examiner* — Andrew L Nalven

(57) ABSTRACT

A method and apparatus for integrating a user interface across multiple operating modes of a digital camera including a display. When the digital camera is placed into each one of the multiple operating modes, mode-specific items corresponding to that mode are displayed on the display. The digital camera includes a first button and a second button for interacting with the multiple operating modes, where the first button has a first orientatioan, and the second button has a second orientation. The method and apparatus includes mapping an aligned set of mode-specific items in the display to the orientation of the first button. After the mode-specific items are displayed, the user scrolls from one mode-specific item to the next in the aligned set by pressing the first button and the display indicates which of the mode-specific items is a currently active item. When a mode-specific item becomes the active item, additional information corresponding to the currently active item is displayed in the display in a location offset from the active item in a direction of orientation corresponding to that of the second button.

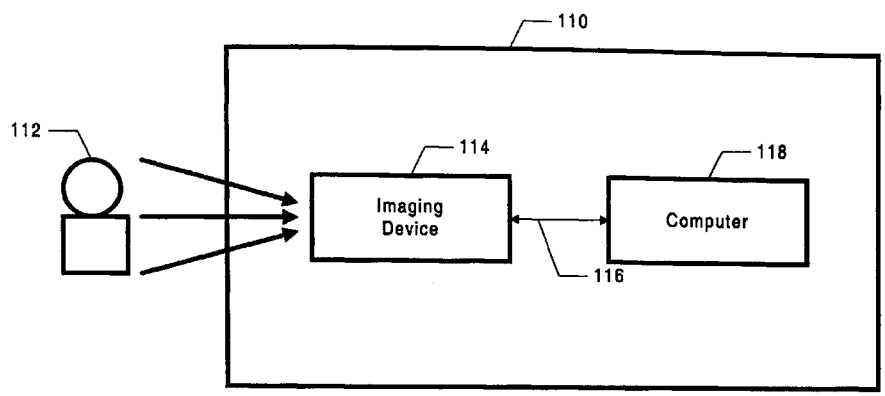

U.S. PATENT DOCUMENTS

| | | |
|---|---|---|
| 4,471,382 A | 9/1984 | Toyoda et al. |
| 4,519,692 A | 5/1985 | Michalik |
| 4,531,161 A | 7/1985 | Murakoshi |
| 4,540,276 A | 9/1985 | Ost |
| 4,574,319 A | 3/1986 | Konishi |
| 4,601,055 A | 7/1986 | Kent |
| 4,623,930 A | 11/1986 | Oshima et al. |
| 4,691,253 A | 9/1987 | Silver |
| 4,723,169 A | 2/1988 | Kaji |
| 4,736,224 A | 4/1988 | Watanabe et al. |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm et al. |
| 4,827,347 A | 5/1989 | Bell |
| 4,855,831 A | 8/1989 | Miyamoto |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori |
| 4,972,495 A | 11/1990 | Blike et al. |
| 4,982,291 A | 1/1991 | Kurahashi |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson |
| 5,018,017 A | 5/1991 | Sasaki et al. |
| 5,020,012 A | 5/1991 | Stockberger |
| 5,021,989 A | 6/1991 | Fujisawa et al. |
| 5,027,150 A | 6/1991 | Inoue |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski |
| 5,040,070 A | 8/1991 | Higashitsutsumi |
| 5,043,801 A | 8/1991 | Watanabe |
| 5,043,816 A | 8/1991 | Nakano |
| 5,057,924 A | 10/1991 | Yamada |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash |
| 5,101,364 A | 3/1992 | Davenport |
| 5,106,107 A | 4/1992 | Justus |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts |
| 5,138,460 A | 8/1992 | Egawa |
| 5,140,358 A | 8/1992 | Tokunaga |
| 5,142,319 A | 8/1992 | Wakabayashi |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short |
| 5,164,751 A | 11/1992 | Weyer |
| 5,164,831 A | 11/1992 | Kuchta |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty |
| 5,193,538 A | 3/1993 | Ekwall |
| 5,194,944 A | 3/1993 | Uchiyama |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein |
| 5,220,420 A | 6/1993 | Hoarty et al. |
| 5,220,614 A | 6/1993 | Crain |
| 5,223,935 A | 6/1993 | Tsuji |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki |
| 5,237,648 A | 8/1993 | Mills |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka |
| 5,253,071 A | 10/1993 | MacKay |
| 5,260,795 A | 11/1993 | Sakai |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga |
| 5,335,072 A | 8/1994 | Tanaka et al. |
| 5,341,466 A | 8/1994 | Perlin |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack |
| 5,367,318 A | 11/1994 | Beaudin et al. |
| 5,373,153 A | 12/1994 | Cumberledge |
| 5,375,160 A | 12/1994 | Guidon et al. |
| 5,386,111 A | 1/1995 | Zimmerman |
| 5,386,177 A | 1/1995 | Uhm |
| 5,386,552 A | 1/1995 | Garney |
| 5,390,026 A | 2/1995 | Lim |
| 5,390,314 A | 2/1995 | Swanson |
| 5,392,462 A | 2/1995 | Komaki |
| 5,396,343 A | 3/1995 | Hanselman |
| 5,402,170 A | 3/1995 | Parulski et al. |
| 5,402,171 A | 3/1995 | Tagami et al. |
| 5,404,316 A | 4/1995 | Klingler et al. |

| Patent No. | Date | Inventor |
|---|---|---|
| 5,404,505 A | 4/1995 | Levinson |
| 5,408,265 A | 4/1995 | Sasaki |
| 5,414,811 A | 5/1995 | Parulski et al. |
| 5,416,556 A | 5/1995 | Suzuki et al. |
| 5,420,635 A | 5/1995 | Konishi et al. |
| 5,425,137 A | 6/1995 | Mohan et al. |
| 5,428,733 A | 6/1995 | Carr |
| 5,432,871 A | 7/1995 | Novik |
| 5,432,900 A | 7/1995 | Rhodes et al. |
| 5,434,618 A | 7/1995 | Hayashi et al. |
| 5,434,958 A | 7/1995 | Surma et al. |
| 5,434,969 A | 7/1995 | Heilveil et al. |
| 5,436,657 A | 7/1995 | Fukuoka |
| 5,436,659 A | 7/1995 | Vincent |
| 5,440,401 A | 8/1995 | Parulski et al. |
| 5,442,465 A | 8/1995 | Compton |
| 5,444,482 A | 8/1995 | Misawa et al. |
| 5,448,372 A | 9/1995 | Axman et al. |
| 5,452,145 A | 9/1995 | Wakui et al. |
| 5,459,830 A | 10/1995 | Ohba et al. |
| 5,461,429 A | 10/1995 | Konishi et al. |
| 5,463,728 A | 10/1995 | Blahut |
| 5,463,729 A | 10/1995 | Kitaguchi |
| 5,465,133 A | 11/1995 | Aoki et al. |
| 5,467,288 A | 11/1995 | Fasciano et al. |
| 5,473,370 A | 12/1995 | Moronaga et al. |
| 5,473,371 A | 12/1995 | Choi |
| 5,475,428 A | 12/1995 | Hintz et al. |
| 5,475,441 A | 12/1995 | Parulski et al. |
| 5,475,812 A | 12/1995 | Corona et al. |
| 5,477,264 A | 12/1995 | Sarbadhikari et al. |
| 5,481,330 A | 1/1996 | Yamasaki |
| 5,481,667 A | 1/1996 | Bieniek et al. |
| 5,486,853 A | 1/1996 | Baxter |
| 5,488,414 A | 1/1996 | Hirasawa |
| 5,489,945 A | 2/1996 | Kannegundla |
| 5,489,955 A | 2/1996 | Satoh |
| 5,493,332 A | 2/1996 | Dalton |
| 5,493,335 A | 2/1996 | Parulski et al. |
| 5,495,342 A | 2/1996 | Harigaya |
| 5,495,559 A | 2/1996 | Makino |
| 5,496,106 A | 3/1996 | Anderson |
| 5,497,193 A | 3/1996 | Mitsuhashi |
| 5,500,936 A | 3/1996 | Allen et al. |
| 5,502,486 A | 3/1996 | Ueda |
| 5,510,830 A | 4/1996 | Ohia et al. |
| 5,512,941 A | 4/1996 | Takahashi |
| 5,513,306 A | 4/1996 | Mills |
| 5,513,342 A | 4/1996 | Leong et al. |
| 5,515,101 A | 5/1996 | Yoshida |
| 5,517,606 A | 5/1996 | Matheny et al. |
| 5,519,815 A | 5/1996 | Klassen |
| 5,521,639 A | 5/1996 | Tomura |
| 5,521,663 A | 5/1996 | Norris |
| 5,521,717 A | 5/1996 | Maeda |
| 5,521,841 A | 5/1996 | Arman et al. |
| 5,523,786 A | 6/1996 | Parulski |
| 5,523,857 A | 6/1996 | Fukushima |
| 5,525,957 A | 6/1996 | Tanaka |
| 5,528,293 A | 6/1996 | Watanabe |
| 5,528,315 A | 6/1996 | Sugiyama |
| 5,530,235 A | 6/1996 | Stefik et al. |
| 5,532,740 A | 7/1996 | Wakui |
| 5,534,975 A | 7/1996 | Stefik et al. |
| 5,537,151 A | 7/1996 | Orr |
| 5,537,530 A | 7/1996 | Edgar |
| 5,539,528 A | 7/1996 | Tawa |
| 5,539,535 A | 7/1996 | Aizawa et al. |
| 5,539,658 A | 7/1996 | McCullough |
| 5,541,656 A | 7/1996 | Kare et al. |
| 5,548,371 A | 8/1996 | Kawahara |
| 5,548,409 A | 8/1996 | Ohta et al. |
| 5,550,646 A | 8/1996 | Hassan et al. |
| 5,550,938 A | 8/1996 | Hayakawa et al. |
| 5,552,806 A | 9/1996 | Lenchik |
| 5,553,277 A | 9/1996 | Hirano et al. |
| 5,555,193 A | 9/1996 | Tsinberg et al. |
| 5,559,554 A | 9/1996 | Uekane et al. |
| 5,560,022 A | 9/1996 | Dunstan et al. |
| 5,563,655 A | 10/1996 | Lathrop |
| 5,568,167 A | 10/1996 | Galbi |
| 5,568,192 A | 10/1996 | Hannah |
| 5,572,233 A | 11/1996 | Kakegawa |
| 5,574,933 A | 11/1996 | Horst |
| 5,576,757 A | 11/1996 | Roberts et al. |
| 5,576,759 A | 11/1996 | Kawamura et al. |
| 5,577,190 A | 11/1996 | Peters |
| 5,578,757 A | 11/1996 | Roth |
| 5,579,048 A | 11/1996 | Hirasawa |
| 5,579,450 A | 11/1996 | Hanyu |
| 5,581,311 A | 12/1996 | Kuroiwa |
| 5,585,845 A | 12/1996 | Kawamura |
| 5,587,740 A | 12/1996 | Brennan |
| 5,589,902 A | 12/1996 | Gruel et al. |
| 5,590,306 A | 12/1996 | Watanabe et al. |
| 5,592,301 A | 1/1997 | Shimada |
| 5,594,524 A | 1/1997 | Sasagaki |
| 5,597,193 A | 1/1997 | Conner |
| 5,606,365 A | 2/1997 | Maurinus |
| 5,608,491 A | 3/1997 | Sasagaki |
| 5,610,653 A | 3/1997 | Abecassis |
| 5,619,738 A | 4/1997 | Petruchik |
| 5,621,459 A | 4/1997 | Ueda |
| 5,621,906 A | 4/1997 | O'Neill |
| 5,625,412 A | 4/1997 | Aciu et al. |
| 5,630,017 A | 5/1997 | Gasper et al. |
| 5,631,701 A | 5/1997 | Miyake |
| 5,631,871 A | 5/1997 | Park et al. |
| 5,633,573 A | 5/1997 | Van Phuoc et al. |
| 5,633,678 A | 5/1997 | Parulski et al. |
| 5,633,976 A | 5/1997 | Ogino |
| 5,634,000 A | 5/1997 | Wicht |
| 5,635,983 A | 6/1997 | Ohmori |
| 5,635,984 A | 6/1997 | Lee |
| 5,637,871 A | 6/1997 | Piety et al. |
| 5,638,123 A | 6/1997 | Yamaguchi |
| 5,638,498 A | 6/1997 | Tyler et al. |
| 5,638,501 A | 6/1997 | Gough et al. |
| 5,640,193 A | 6/1997 | Wellner |
| 5,640,202 A | 6/1997 | Kondo |
| 5,640,204 A | 6/1997 | Tsutsui |
| 5,640,627 A | 6/1997 | Nakano |
| 5,644,694 A | 7/1997 | Appleton |
| 5,648,816 A | 7/1997 | Wakui |
| 5,649,032 A | 7/1997 | Burt et al. |
| 5,649,186 A | 7/1997 | Ferguson |
| 5,651,107 A | 7/1997 | Frank et al. |
| 5,659,547 A | 8/1997 | Scarr et al. |
| 5,659,729 A | 8/1997 | Nielsen |
| 5,664,087 A | 9/1997 | Tani et al. |
| 5,666,580 A | 9/1997 | Ito et al. |
| 5,668,639 A | 9/1997 | Martin |
| 5,671,378 A | 9/1997 | Acker et al. |
| 5,671,440 A | 9/1997 | Curry |
| 5,673,304 A | 9/1997 | Connor et al. |
| 5,674,003 A | 10/1997 | Andersen |
| 5,675,358 A | 10/1997 | Bullock et al. |
| 5,675,752 A | 10/1997 | Scott et al. |
| 5,680,533 A | 10/1997 | Yamato |
| 5,680,534 A | 10/1997 | Yamato et al. |
| 5,682,197 A | 10/1997 | Moghadam et al. |
| 5,682,207 A | 10/1997 | Takeda et al. |

| Patent | Kind | Date | Inventor |
|---|---|---|---|
| 5,682,326 | A | 10/1997 | Klingler et al. |
| 5,682,441 | A | 10/1997 | Ligtenberg et al. |
| 5,684,511 | A | 11/1997 | Westerink et al. |
| 5,684,542 | A | 11/1997 | Tsukagoshi |
| 5,687,408 | A | 11/1997 | Park |
| 5,699,109 | A | 12/1997 | Nishimura et al. |
| 5,703,644 | A | 12/1997 | Mori et al. |
| 5,706,049 | A | 1/1998 | Moghadam et al. |
| 5,706,097 | A | 1/1998 | Schelling et al. |
| 5,706,457 | A | 1/1998 | Dwyer et al. |
| 5,708,810 | A | 1/1998 | Kern et al. |
| 5,711,330 | A | 1/1998 | Nelson |
| 5,719,967 | A | 2/1998 | Sekine |
| 5,719,978 | A | 2/1998 | Kakii et al. |
| 5,719,987 | A | 2/1998 | Kawamura |
| 5,721,908 | A | 2/1998 | Lagarde |
| 5,721,909 | A | 2/1998 | Oulid-Aissa et al. |
| 5,724,070 | A | 3/1998 | Denninghoff et al. |
| 5,724,475 | A | 3/1998 | Kirsten |
| 5,724,579 | A | 3/1998 | Suzuki |
| 5,727,112 | A | 3/1998 | Kellar et al. |
| 5,727,159 | A | 3/1998 | Kikinis |
| 5,729,289 | A | 3/1998 | Etoh |
| 5,734,427 | A | 3/1998 | Hayashi |
| 5,734,436 | A | 3/1998 | Abe |
| 5,734,915 | A | 3/1998 | Roewer |
| 5,737,032 | A | 4/1998 | Stenzel |
| 5,737,476 | A | 4/1998 | Kim |
| 5,737,491 | A | 4/1998 | Allen et al. |
| 5,740,267 | A | 4/1998 | Echerer |
| 5,740,801 | A | 4/1998 | Branson |
| 5,742,339 | A | 4/1998 | Wakui |
| 5,742,475 | A | 4/1998 | Riddiford |
| 5,742,504 | A | 4/1998 | Meyer et al. |
| 5,742,659 | A | 4/1998 | Atac |
| 5,742,698 | A | 4/1998 | Minami et al. |
| 5,748,326 | A | 5/1998 | Thompson-Bell et al. |
| 5,748,831 | A | 5/1998 | Kubo |
| 5,751,350 | A | 5/1998 | Tanaka |
| 5,752,244 | A | 5/1998 | Rose |
| 5,754,873 | A | 5/1998 | Nolan |
| 5,757,418 | A | 5/1998 | Inagaki |
| 5,757,427 | A | 5/1998 | Miyaguchi |
| 5,757,468 | A | 5/1998 | Patton et al. |
| 5,758,180 | A | 5/1998 | Duffy et al. |
| 5,760,767 | A | 6/1998 | Shore et al. |
| 5,761,655 | A | 6/1998 | Hoffman |
| 5,761,686 | A | 6/1998 | Bloomberg |
| 5,764,276 | A | 6/1998 | Martin et al. |
| 5,764,291 | A | 6/1998 | Fullam |
| 5,767,897 | A | 6/1998 | Howell |
| 5,767,904 | A | 6/1998 | Miyake |
| 5,769,713 | A | 6/1998 | Katayama |
| 5,771,034 | A | 6/1998 | Gibson |
| 5,773,810 | A | 6/1998 | Hussey |
| 5,774,131 | A | 6/1998 | Kim |
| 5,781,175 | A | 7/1998 | Hara |
| 5,781,650 | A | 7/1998 | Lobo |
| 5,781,798 | A | 7/1998 | Beatty et al. |
| 5,784,177 | A | 7/1998 | Sanchez et al. |
| 5,784,525 | A | 7/1998 | Bell |
| 5,784,629 | A | 7/1998 | Anderson |
| 5,786,851 | A | 7/1998 | Kondo |
| D396,853 | S | 8/1998 | Cooper et al. |
| 5,790,094 | A | 8/1998 | Tanigawa et al. |
| 5,790,800 | A | 8/1998 | Gauvin et al. |
| 5,796,428 | A | 8/1998 | Matsumoto et al. |
| 5,796,875 | A | 8/1998 | Read |
| 5,797,051 | A | 8/1998 | McIntyre |
| 5,801,685 | A | 9/1998 | Miller et al. |
| 5,801,770 | A | 9/1998 | Paff et al. |
| 5,801,773 | A | 9/1998 | Ikeda |
| 5,805,153 | A | 9/1998 | Nielsen |
| 5,805,163 | A | 9/1998 | Bagnas |
| 5,805,829 | A | 9/1998 | Cohen et al. |
| 5,806,005 | A | 9/1998 | Hull |
| 5,806,072 | A | 9/1998 | Kuba et al. |
| 5,815,160 | A | 9/1998 | Kikuchi |
| 5,815,201 | A | 9/1998 | Hashimoto |
| 5,818,977 | A | 10/1998 | Tansley |
| 5,819,103 | A | 10/1998 | Endoh et al. |
| 5,821,997 | A | 10/1998 | Kawamura |
| 5,822,492 | A | 10/1998 | Wakui et al. |
| 5,822,581 | A | 10/1998 | Christeson |
| 5,828,406 | A | 10/1998 | Parulski |
| 5,828,793 | A | 10/1998 | Mann |
| 5,831,590 | A | 11/1998 | Ikedo |
| 5,831,872 | A | 11/1998 | Pan |
| 5,835,761 | A | 11/1998 | Ishii et al. |
| 5,835,772 | A | 11/1998 | Thurlo |
| 5,838,325 | A | 11/1998 | Deen et al. |
| 5,841,422 | A | 11/1998 | Shyu |
| 5,841,471 | A | 11/1998 | Endsley et al. |
| 5,845,166 | A | 12/1998 | Fellegara |
| 5,847,706 | A | 12/1998 | Kingsley |
| 5,848,193 | A | 12/1998 | Garcia |
| 5,848,420 | A | 12/1998 | Xu |
| 5,850,483 | A | 12/1998 | Takabatake et al. |
| 5,852,502 | A | 12/1998 | Beckett |
| 5,861,918 | A | 1/1999 | Anderson |
| 5,862,218 | A | 1/1999 | Steinberg |
| 5,867,214 | A | 2/1999 | Anderson |
| 5,870,756 | A | 2/1999 | Nakata |
| 5,873,007 | A | 2/1999 | Ferrada Suarez |
| 5,874,959 | A | 2/1999 | Rowe |
| 5,877,746 | A | 3/1999 | Parks et al. |
| 5,881,205 | A | 3/1999 | Andrew |
| 5,883,610 | A | 3/1999 | Jeon |
| 5,892,511 | A | 4/1999 | Gelsinger et al. |
| 5,892,847 | A | 4/1999 | Johnson |
| 5,896,131 | A | 4/1999 | Alexander |
| 5,896,203 | A | 4/1999 | Shibata |
| 5,898,434 | A | 4/1999 | Small et al. |
| 5,898,779 | A | 4/1999 | Squilla et al. |
| 5,898,833 | A | 4/1999 | Kidder |
| 5,900,909 | A | 5/1999 | Parulski et al. |
| 5,901,303 | A | 5/1999 | Chew |
| 5,903,309 | A | 5/1999 | Anderson |
| 5,903,786 | A | 5/1999 | Goto |
| 5,907,315 | A | 5/1999 | Vlahos et al. |
| 5,910,805 | A | 6/1999 | Hickey |
| 5,917,488 | A | 6/1999 | Anderson et al. |
| 5,920,726 | A | 7/1999 | Anderson |
| 5,926,208 | A | 7/1999 | Noonen et al. |
| 5,929,904 | A | 7/1999 | Uchida |
| 5,933,137 | A | 8/1999 | Anderson |
| 5,937,106 | A | 8/1999 | Murayama |
| 5,938,766 | A | 8/1999 | Anderson |
| 5,940,080 | A | 8/1999 | Ruehle |
| 5,940,121 | A | 8/1999 | Mcintyre et al. |
| 5,943,050 | A | 8/1999 | Bullock et al. |
| 5,943,093 | A | 8/1999 | Anderson et al. |
| 5,949,408 | A | 9/1999 | Kang et al. |
| 5,949,432 | A | 9/1999 | Gough et al. |
| 5,949,474 | A | 9/1999 | Gerszberg et al. |
| 5,949,496 | A | 9/1999 | Kim |
| 5,949,950 | A | 9/1999 | Kubo |
| 5,956,084 | A | 9/1999 | Moronaga et al. |
| 5,963,670 | A | 10/1999 | Lipson et al. |
| 5,966,122 | A | 10/1999 | Itoh |
| 5,969,718 | A | 10/1999 | Mills |
| 5,969,761 | A | 10/1999 | Takahashi et al. |

| | | | | | | |
|---|---|---|---|---|---|---|
| 5,973,691 A | 10/1999 | Servan-Schreiber | | 6,144,362 A | 11/2000 | Kawai |
| 5,973,694 A | 10/1999 | Steele et al. | | 6,147,703 A | 11/2000 | Miller et al. |
| 5,973,734 A | 10/1999 | Anderson | | 6,147,709 A | 11/2000 | Martin et al. |
| 5,974,386 A | 10/1999 | Ejima et al. | | 6,157,394 A | 12/2000 | Anderson |
| 5,977,975 A | 11/1999 | Mugura et al. | | 6,161,131 A | 12/2000 | Garfinkle |
| 5,977,976 A | 11/1999 | Maeda | | 6,167,469 A | 12/2000 | Safai |
| 5,977,985 A | 11/1999 | Ishii | | 6,169,575 B1 | 1/2001 | Anderson |
| 5,978,016 A | 11/1999 | Lourette et al. | | 6,169,725 B1 | 1/2001 | Gibbs et al. |
| 5,978,020 A | 11/1999 | Watanabe et al. | | 6,175,663 B1 | 1/2001 | Huang |
| 5,978,607 A | 11/1999 | Teremy | | 6,177,956 B1 | 1/2001 | Anderson et al. |
| 5,982,350 A | 11/1999 | Hekmatpour et al. | | 6,177,957 B1 | 1/2001 | Anderson |
| 5,982,429 A | 11/1999 | Kamamoto et al. | | 6,188,431 B1 | 2/2001 | Oie |
| 5,983,297 A | 11/1999 | Noble et al. | | 6,188,432 B1 | 2/2001 | Ejima |
| 5,986,701 A | 11/1999 | Anderson | | 6,188,782 B1 | 2/2001 | Le Beux |
| 5,987,223 A | 11/1999 | Narukawa et al. | | 6,204,877 B1 | 3/2001 | Kiyokawa |
| 5,991,465 A | 11/1999 | Anderson | | 6,205,485 B1 | 3/2001 | Kikinis |
| 5,991,515 A | 11/1999 | Fall et al. | | 6,209,048 B1 | 3/2001 | Wolff |
| 5,993,137 A | 11/1999 | Harr | | 6,211,870 B1 | 4/2001 | Foster |
| 5,999,173 A | 12/1999 | Ubillos | | 6,215,523 B1 | 4/2001 | Anderson |
| 5,999,191 A | 12/1999 | Frank et al. | | 6,222,538 B1 | 4/2001 | Anderson |
| 5,999,207 A | 12/1999 | Rodriguez et al. | | 6,223,190 B1 | 4/2001 | Aihara et al. |
| 5,999,740 A | 12/1999 | Rowley | | 6,226,449 B1 | 5/2001 | Inoue et al. |
| 6,003,093 A | 12/1999 | Kester | | 6,229,566 B1 | 5/2001 | Matsumoto et al. |
| 6,005,613 A | 12/1999 | Endsley et al. | | 6,230,307 B1 | 5/2001 | Davis et al. |
| 6,005,618 A | 12/1999 | Fukui | | 6,233,015 B1 | 5/2001 | Miller |
| 6,006,039 A | 12/1999 | Steinberg et al. | | 6,237,010 B1 | 5/2001 | Hui |
| 6,009,336 A | 12/1999 | Harris et al. | | 6,239,794 B1 | 5/2001 | Yuen et al. |
| 6,011,585 A | 1/2000 | Anderson | | 6,239,837 B1 | 5/2001 | Yamada et al. |
| 6,011,926 A | 1/2000 | Cockell | | 6,246,430 B1 | 6/2001 | Peters |
| 6,012,088 A | 1/2000 | Li et al. | | 6,249,316 B1 | 6/2001 | Anderson |
| 6,015,093 A | 1/2000 | Barrett | | 6,256,063 B1 | 7/2001 | Saito et al. |
| 6,020,920 A | 2/2000 | Anderson | | 6,262,769 B1 | 7/2001 | Anderson |
| 6,020,982 A | 2/2000 | Yamauchi et al. | | 6,275,260 B1 | 8/2001 | Anderson |
| 6,022,315 A | 2/2000 | Iliff | | 6,278,447 B1 | 8/2001 | Anderson |
| 6,023,241 A | 2/2000 | Clapper | | 6,285,398 B1 | 9/2001 | Shinsky et al. |
| 6,023,697 A | 2/2000 | Bates et al. | | 6,292,218 B1 | 9/2001 | Parulski et al. |
| 6,025,827 A | 2/2000 | Bullock et al. | | RE37,431 E | 10/2001 | Lanier et al. |
| 6,028,603 A | 2/2000 | Wang et al. | | 6,300,950 B1 | 10/2001 | Clark et al. |
| 6,028,611 A | 2/2000 | Anderson et al. | | 6,304,851 B1 | 10/2001 | Kmack et al. |
| 6,031,964 A | 2/2000 | Anderson | | 6,307,544 B1 | 10/2001 | Harding |
| 6,035,323 A | 3/2000 | Narayen et al. | | 6,310,647 B1 | 10/2001 | Parulski et al. |
| 6,035,359 A | 3/2000 | Enoki | | 6,310,648 B1 | 10/2001 | Miller et al. |
| 6,037,972 A | 3/2000 | Horiuchi et al. | | 6,317,141 B1 | 11/2001 | Pavley |
| 6,038,545 A | 3/2000 | Mandeberg et al. | | 6,334,025 B1 | 12/2001 | Yamagami |
| 6,052,555 A | 4/2000 | Ferguson | | 6,353,848 B1 | 3/2002 | Morris |
| 6,052,692 A | 4/2000 | Anderson | | 6,356,281 B1 | 3/2002 | Isenman |
| 6,058,428 A | 5/2000 | Wang et al. | | 6,356,357 B1 | 3/2002 | Anderson |
| 6,072,479 A | 6/2000 | Ogawa | | 6,380,972 B1 | 4/2002 | Suga et al. |
| 6,072,480 A | 6/2000 | Gorbet et al. | | 6,400,375 B1 | 6/2002 | Okudaira |
| 6,072,489 A | 6/2000 | Gough et al. | | 6,400,471 B1 | 6/2002 | Kuo et al. |
| 6,075,905 A | 6/2000 | Herman et al. | | 6,426,771 B1 | 7/2002 | Kosugi |
| 6,078,005 A | 6/2000 | Kurakake | | 6,437,829 B1 | 8/2002 | Webb |
| 6,078,756 A | 6/2000 | Squilla et al. | | 6,441,854 B2 | 8/2002 | Fellegara et al. |
| 6,082,827 A | 7/2000 | McFall | | 6,441,927 B1 | 8/2002 | Dow et al. |
| 6,084,990 A | 7/2000 | Suzuki et al. | | 6,445,412 B1 | 9/2002 | Shiohara |
| 6,091,846 A | 7/2000 | Lin et al. | | 6,473,123 B1 | 10/2002 | Anderson |
| 6,091,956 A | 7/2000 | Hollenberg | | 6,483,602 B1 | 11/2002 | Haneda |
| 6,094,221 A | 7/2000 | Andersion | | 6,486,914 B1 | 11/2002 | Anderson |
| 6,097,389 A | 8/2000 | Morris et al. | | 6,493,028 B1 | 12/2002 | Anderson |
| 6,097,430 A | 8/2000 | Komiya et al. | | 6,504,575 B1 | 1/2003 | Ramirez et al. |
| 6,097,431 A | 8/2000 | Anderson | | 6,507,362 B1 | 1/2003 | Akerib |
| 6,111,604 A | 8/2000 | Hashimoto | | 6,512,548 B1 | 1/2003 | Anderson |
| 6,118,480 A | 9/2000 | Anderson et al. | | 6,515,704 B1 | 2/2003 | Sato |
| 6,122,003 A | 9/2000 | Anderson | | 6,532,039 B2 | 3/2003 | Anderson |
| 6,122,005 A | 9/2000 | Sasaki | | 6,536,357 B1 | 3/2003 | Hiestand |
| 6,122,409 A | 9/2000 | Boggs et al. | | 6,538,698 B1 | 3/2003 | Anderson |
| 6,128,013 A | 10/2000 | Prabhu | | 6,563,535 B1 | 5/2003 | Anderson |
| 6,128,413 A | 10/2000 | Benamara | | 6,563,542 B1 | 5/2003 | Hatakenaka et al. |
| 6,137,468 A | 10/2000 | Martinez | | 6,567,122 B1 | 5/2003 | Anderson et al. |
| 6,137,534 A | 10/2000 | Anderson | | 6,571,271 B1 | 5/2003 | Savitzky et al. |
| 6,141,044 A | 10/2000 | Anderson | | 6,682,207 B2 | 1/2004 | Weber et al. |

| | | | |
|---|---|---|---|
| 6,683,649 B1 | 1/2004 | Anderson | |
| 6,738,075 B1 | 5/2004 | Torres | |
| 6,747,692 B2 | 6/2004 | Patel et al. | |
| 6,765,612 B1 | 7/2004 | Anderson et al. | |
| 6,779,153 B1 | 8/2004 | Kagle | |
| 6,803,945 B1 | 10/2004 | Needham | |
| 6,806,906 B1 | 10/2004 | Soga et al. | |
| 6,897,891 B2 | 5/2005 | Itsukaichi | |
| 6,965,400 B1 | 11/2005 | Haba et al. | |
| 7,050,143 B1 | 5/2006 | Silverbrook | |
| 7,215,371 B2 | 5/2007 | Fellegara et al. | |
| 7,337,403 B2 | 2/2008 | Pavley | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0463856 A2 | 1/1992 | |
| EP | 0519379 A2 | 6/1992 | |
| EP | 0528084 A1 | 2/1993 | |
| EP | 0555048 A2 | 8/1993 | |
| EP | 0568468 A2 | 11/1993 | |
| EP | 0617542 A2 | 9/1994 | |
| EP | 0650125 A1 | 4/1995 | |
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0729271 A2 | 8/1996 | |
| EP | 0449106 B1 | 12/1996 | |
| EP | 0817476 A2 | 1/1998 | |
| EP | 0821522 A2 | 1/1998 | |
| EP | 0835011 A1 | 4/1998 | |
| EP | 0860735 A2 | 8/1998 | |
| EP | 0860982 A2 | 8/1998 | |
| EP | 0890919 A1 | 1/1999 | |
| GB | 2245749 A | 1/1992 | |
| GB | 2289555 A | 11/1995 | |
| JP | 55-142470 A | 11/1980 | |
| JP | 55-142471 A | 11/1980 | |
| JP | 62-271178 A | 11/1987 | |
| JP | 1-132173 A | 5/1989 | |
| JP | 1-238382 A | 9/1989 | |
| JP | 1-319870 A | 12/1989 | |
| JP | 2-42489 A | 2/1990 | |
| JP | 2-162420 A | 6/1990 | |
| JP | 2-257262 A | 10/1990 | |
| JP | 2-280484 A | 11/1990 | |
| JP | 3-117181 A | 5/1991 | |
| JP | 3-231574 A | 10/1991 | |
| JP | 3-246766 A | 11/1991 | |
| JP | 3-506111 A | 12/1991 | |
| JP | 4-115788 A | 4/1992 | |
| JP | 4-120889 A | 4/1992 | |
| JP | 4-230517 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | 5-260351 A | 10/1993 | |
| JP | 5-289838 A | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |
| JP | 6-103352 A | 4/1994 | |
| JP | 6-105266 A | 4/1994 | |
| JP | 6-178261 A | 6/1994 | |
| JP | 6-197299 A | 7/1994 | |
| JP | 6-265794 A | 9/1994 | |
| JP | 6-290103 A | 10/1994 | |
| JP | 6-348467 A | 12/1994 | |
| JP | 6-350949 A | 12/1994 | |
| JP | 7-6028 A | 1/1995 | |
| JP | 7-160842 A | 6/1995 | |
| JP | 7-168852 A | 7/1995 | |
| JP | 7-184160 A | 7/1995 | |
| JP | 7-221911 A | 8/1995 | |
| JP | 7-245723 A | 9/1995 | |
| JP | 7-274060 A | 10/1995 | |
| JP | 7-274108 A | 10/1995 | |
| JP | 7-295873 A | 11/1995 | |
| JP | 8-32847 A | 2/1996 | |
| JP | 8-502840 A | 3/1996 | |
| JP | 8-111845 A | 4/1996 | |
| JP | 8-114849 A | 5/1996 | |
| JP | 8-116476 A | 5/1996 | |
| JP | 8-140025 A | 5/1996 | |
| JP | 8-147952 A | 6/1996 | |
| JP | 8-205014 A | 8/1996 | |
| JP | 8-223524 A | 8/1996 | |
| JP | 8-249450 A | 9/1996 | |
| JP | 8-279034 A | 10/1996 | |
| JP | 8-331495 A | 12/1996 | |
| JP | 8-332297 A | 12/1996 | |
| JP | 9-27939 A | 1/1997 | |
| JP | 9-37139 A | 2/1997 | |
| JP | 9-163275 A | 6/1997 | |
| JP | 9-171213 A | 6/1997 | |
| JP | 9-311850 A | 12/1997 | |
| JP | 10-4535 A | 1/1998 | |
| JP | 10-162020 A | 6/1998 | |
| JP | 10-243331 A | 9/1998 | |
| JP | 2000-92439 A | 3/2000 | |
| JP | 2000-510616 A | 8/2000 | |
| JP | 2000-287110 A | 10/2000 | |
| JP | 2001-501416 A | 1/2001 | |
| WO | WO-91/14334 A1 | 9/1991 | |
| WO | WO-92/05652 A2 | 4/1992 | |
| WO | WO-92/05655 A1 | 4/1992 | |
| WO | WO-92/091969 A1 | 5/1992 | |
| WO | WO-92/20186 A1 | 11/1992 | |
| WO | WO-94/23375 A1 | 10/1994 | |
| WO | WO-95/32583 A1 | 11/1995 | |
| WO | WO-96/02106 A1 | 1/1996 | |
| WO | WO-96/29818 A1 | 9/1996 | |
| WO | WO-97/17669 A1 | 5/1997 | |
| WO | WO-97/38510 A1 | 10/1997 | |
| WO | WO-98/14887 A1 | 4/1998 | |

OTHER PUBLICATIONS

Buderi, Robert, "Photos That Talk," *Upside Today*, Jan. 27, 1999, <http://www.uspide.com/texis/mvm/story?id=36b0cb860>.

*Sony Digital Still Camera DSC–F1 Operating Instructions*, pp. 1–6, 16–17, 22–25, and 57–58, published 1996.

"Laboratory Analysis—Data Link: The Future of Camera Technology," *Popular Photography*, Sep. 1993,p. 48.

"PCMCIA for PowerBook 500 Series Computers," *Apple-Facts Online*, 1994, <http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire*, Oct. 7, 1998.

Grimm, Leigh, "The Manipulation Proclamation," *Photo Trade News*, Feb. 1997, p. 66.

"Kodak DC34009 Zoom—Distinctive New Kodak DC3400 Zoom Digital Camera Offers Easy–to–Use Features, Stylish New Look, All at Affordable Price," *Kodak Press Release*, Aug. 1, 2000.

Hauf et al., "The FlashPix™ Image File Format," *The Fourth Color Imaging Conference Color Science, Systems and Applications*, 1996, pp. 234–238.

Watanabe et al., "An Image Data File Format for Digital Still Camera," *IS&T's 48th Annual Conference Proceedings*, May 1995, vol. 48, pp. 421–424.

"Disk Drive with Embedded Hyper–Text Markup Language Server," *IBM Technical Disclosure Bulletin*, vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics*, vol. 44, No. 3, Aug. 1998, pp. 686–691.

Mann, Steve, "Headmounted Wireless Video: Computer–Supported Collaboration for Photojournalism and Everyday Use," *IEEE Communications Magazine*, vol. 36, No. 6, Jun. 1998, pp. 144–151.

Williams, Matyn, "Review—NEC PC–DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image–Capture Platform," *Apple Directions*, Aug. 1996.

"Device Drivers via the Access Bus," *IBM Technical Disclosure Bulletin*, vol. 39, No. 1, Jan. 1996, pp. 135–136.

Degann et al., "Still Images Retrieval from a Remote Database: The System Imagine," *Signal Processing: Image Communication*, vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix digital Card Camera DS–220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing*, Nikkei Business Publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible*, Third Edition, Nov. 1991, pp. 63–64, 324, 931, 945, Goldstein & Blair, Berkeley, California.

*Liquid Crystal Digital Camera QV–10B Owner's Manual*, Casio, 1995, pp. 1–89, Casio Computer Co., Ltd.

Foley et al., *Introduction to Computer Graphics*, 1994, 1990, pp. 505–509, Addison–Wesley Publishing Company, Inc.

Foley et al., *Computer Graphics—Principles and Practice, Second Edition*, Jun. 15, 1990, pp. 754–759, Addison–Wesley Publication Company, Inc.

*Inside Macintosh*, Apple Computer, 1993, pp. 1–5 to 1–8 and 4–1 to 4–46, Apple Computer Inc., Cupertino, California.

Kroiak et al.,"a Declaration of Device Independence," *ESD: The Electronic System Design Magazine*, May 1988, pp. 63–65, vol. 18, No. 5.

Melville et al., "An Application Programmer's Interface for Digital Cameras," Imaging Science and Technology's 49$^{th}$ Annual Conference, May 19–24, 1996, The Society for Imaging Science and Technology.

*Picona PC–DC200 PC–DC200K User's Manual*, Feb. 1997, NEC Corporation.

Posnak et al., "An Adaptive Framework for Developing Multimedia Software Components," *Communications of the ACM*, Oct. 1997, pp. 43–47, vol. 40, No. 10, ACM.

*Ricoh Digital Camera RDC–1 Instruction Manual*, Ricoh, Ricoh Americas Corp., Ricoh Co., Ltd. Japan.

Shimizu et al., "The Digital Camera Using New Compression and Interpolation Algorithm," IS&T 49$^{th}$ Annual Conference, May 19–24, 1996, pp. 268–272, IS&T, Sprintfield, Virginia.

Skelton et al., "Design and Development of a Transportable Image Processing and GIS System," *Infrared Image Processing and Enhancement*, May 20–21, 1987, pp. 187–191, vol. 781, SPIE, Bellingham, Washington.

*Texas Instruments TI–85 Guidebook*, 1993, Texas Instruments Incorporated.

*Texas Instruments TI–92 Guidebook*, 1995, Texas Instruments Incorporated.

*VxWorks Programmer's Guide*, 1984–1999, Wind River Systems, Inc.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-20, 22-28 and 31 is confirmed.

New claims 32-103 are added and determined to be patentable.

Claims 21, 29 and 30 were not reexamined.

32. *The method of claim 1 wherein at a given time a displayed group of the mode-specific items in the first operating mode are being displayed and at least one of the mode-specific items for the first operating mode is not being displayed, and further comprising displaying first scrolling indicia configured to inform a user that not all of the mode-specific items for the first operating mode are currently being displayed.*

33. *The method of claim 32 wherein the first scrolling indicia comprises a first arrow that points towards a first scrolling direction to indicate that scrolling in the first scrolling direction will result in the at least one mode-specific item being displayed as one of the new mode-specific items, the first scrolling direction corresponding to the first orientation.*

34. *The method of claim 33 wherein the first arrow is displayed substantially adjacent to one of the displayed group of mode-specific items that is displayed furthest in the first scrolling direction.*

35. *The method of claim 34 wherein when scrolling in a second direction that is opposite the first scrolling direction is not possible, the first scrolling indicia further indicates that scrolling in the second direction is not possible.*

36. *The method of claim 35 wherein to indicate that scrolling in the second direction is not possible, the first scrolling indicia does not provide an arrow that points towards the second direction.*

37. *The method of claim 32 wherein the first scrolling indicia comprises a first arrow that points towards a first scrolling direction and a second arrow that points towards a second scrolling direction that is opposite of the first scrolling direction, the first arrow indicating that scrolling in the first scrolling direction will result in a first of the at least one mode-specific items being displayed as one of the new mode-specific items and the second arrow indicating that scrolling in the second scrolling direction will result in a second of the at least one mode-specific items being displayed as one of the new mode-specific items, the first scrolling direction and the second scrolling direction corresponding to the first orientation.*

38. *The method of claim 37 wherein the first arrow is displayed substantially adjacent to one of the displayed group of mode-specific items that is displayed furthest in the first scrolling direction and the second arrow is displayed substantially adjacent to one of the displayed group of mode-specific items that is displayed furthest in the second scrolling direction.*

39. *The method of claim 1 wherein at a given time a displayed group of the mode-specific items in the first operating mode is being displayed and at least one of the mode-specific items for the first operating mode is not being displayed, and scrolling comprises paging wherein the displayed group of the mode-specific items is removed at one time from being displayed and the at least one of the mode-specific items is subsequently displayed as at least one of the new mode-specific items.*

40. *The method of claim 1 wherein as each one of the mode-specific items is scrolled-off the display, one of the new mode-specific items is scrolled onto the display.*

41. *The method of claim 1 wherein the mode-specific items for the first operating mode are first menu categories; each of the first menu categories is associated with a list of first sub-menu items that correspond to at least one of first settings and first features for the digital camera; and the additional information displayed for the currently active mode-specific item on the display comprises the first sub-menu items that correspond to the currently active mode-specific item.*

42. *The method of claim 41 wherein the mode-specific items for the second operating mode are second menu categories; each of the second menu categories is associated with a list of second sub-menu items that correspond to at least one of second settings and second features for the digital camera; and the additional information displayed for the currently active mode-specific item on the display comprises the second sub-menu items that correspond to the currently active mode-specific item.*

43. *The method of claim 41 further comprising scrolling the first sub-menu items by pressing the second button, wherein a currently active one of the first sub-menu items is indicated.*

44. *The method of claim 43 wherein selection of one of the first sub-menu items facilitates changing the at least one of the first settings and first features that is associated with the one of the first sub-menu items.*

45. *The method of claim 41 further comprising displaying a text label identifying the currently active mode-specific item.*

46. *The method of claim 1 wherein the mode-specific items are displayed as icons that respresent corresponding menu categories.*

47. *The method of claim 1 wherein the first orientation is a horizontal orientation and the second orientation is a vertical orientation.*

48. *The method of claim 1 wherein the second orientation is a horizontal orientation and the first orientation is a vertical orientation.*

49. *The method of claim 1 wherein the mode-specific menu items are aligned adjacent to each other in a row.*

50. *The method of claim 1 wherein the mode-specific menu items are aligned adjacent to each other in a column.*

51. *The method of claim 1 wherein the first orientation is substantially perpendicular to the second orientation.*

52. *The method of claim 1 further comprising capturing a plurality of digital still images; displaying thumbnail representations of at least some of the plurality of digital still images; and navigating through the thumbnail representations.*

53. *The method of claim 1 wherein the additional information provides a plurality of items through which at least one of camera settings and image settings are manipulated.*

54. The method of claim 1 wherein the additional information provides a plurality of items through which image capture settings are manipulated.

55. The digital camera of claim 12 wherein at a given time a displayed group of the mode-specific items of a first operating mode of the at least two operating modes are being displayed and at least one of the mode-specific items of the first operating mode is not being displayed and further comprising means for displaying first scrolling indicia configured to inform a user that not all of the mode-specific items for the first operating mode are currently being displayed.

56. The digital camera of claim 55 wherein the first scrolling indicia comprises a first arrow that points towards a first scrolling direction to indicate that scrolling in the first scrolling direction will result in the at least one mode-specific item being displayed as one of the new mode-specific items, the first scrolling direction corresponding to the first orientation.

57. The digital camera of claim 56 wherein the first arrow is displayed substantially adjacent to one of the displayed group of mode-specific items that is displayed furthest in the first scrolling direction.

58. The digital camera of claim 57 wherein when scrolling in a second direction that is opposite the first scrolling direction is not possible, the first scrolling indicia further indicates that scrolling in the second direction is not possible.

59. The digital camera of claim 58 wherein to indicate that scrolling in the second direction is not possible, the first scrolling indicia does not provide an arrow that points towards the second direction.

60. The digital camera of claim 55 wherein the first scrolling indicia comprises a first arrow that points towards a first scrolling direction and a second arrow that points towards a second strolling direction that is opposite of the first scrolling direction, the first arrow indicating that scrolling in the first scrolling direction will result in a first of the at least one mode-specific item being displayed as one of the new mode-specific items and the second arrow indicating that scrolling in the second scrolling direction will result in a second of the at least one mode-specific item being displayed as one of the new mode-specific items, the first scrolling direction and the second scrolling direction corresponding to the first orientation.

61. The digital camera of claim 60 wherein the first arrow is displayed substantially adjacent to one of the displayed group of mode-specific items that is displayed furthest in the first scrolling direction and the second arrow is displayed substantially adjacent to one of the displayed group of mode-specific items that is displayed furthest in the second scrolling direction.

62. The digital camera of claim 12 wherein at a given time a displayed group of the mode-specific items in the first operating mode is being displayed and at least one of the mode-specific items for a first operating mode of the at least two operating modes is not being displayed, and scrolling comprises paging wherein the displayed group of the mode-specific items is removed at one time from being displayed and the at least one of the mode-specific items is subsequently displayed as at least one of the new mode-specific items.

63. The digital camera of claim 12 wherein as each one of the mode-specific items is scrolled-off the display, one of the new mode-specific items is scrolled onto the display.

64. The digital camera of claim 12 wherein the mode-specific items for a first operating mode of the at least two operating modes are first menu categories; each of the first menu categories is associated with a list of first sub-menu items that correspond to at least one of first settings and first features for the digital camera; and the additional information displayed for the currently active mode-specific item on the display comprises the first sub-menu items that correspond to the currently active mode-specific item.

65. The digital camera of claim 64 wherein the mode-specific items for a second operating mode of the at least two operating modes are second menu categories; each of the second menu categories are associated with a list of second sub-menu items that correspond to at least one of second settings and second features for the ditigal camera; and the additional information displayed for the currently active mode-specific item on the display comprises the second sub-menu items that correspond to the currently active mode-specific item.

66. The digital camera of claim 64 further comprising scrolling the first sub-menu items by pressing the second set of navigation buttons wherein a currently active one of the sub-menu items is indicated.

67. The digital camera of claim 66 wherein selection of one of the first sub-menu items facilitates changing the at least one of the first settings and first features that is associated with the one of the first sub-menu items.

68. The digital camera of claim 64 wherein the means for displaying is further configured for displaying a text label identifying the currently active mode-specific item.

69. The digital camera of claim 12 wherein the mode-specific items are displayed as icons that represent corresponding menu categories.

70. The digital camera of claim 12 wherein the first orientation is a horizontal orientation and the second orientation is a vertical orientation.

71. The digital camera of claim 12 wherein the second orientation is a horizontal orientation and the first orientation is a vertical orientation.

72. The digital camera of claim 12 wherein the mode-specific menu items are aligned adjacent to each other in a row.

73. The digital camera of claim 12 wherein the mode-specific menu items are aligned adjacent to each other in a column.

74. The digital camera of claim 12 wherein the first orientation is substantially perpendicular to the second orientation.

75. The digital camera of claim 12 further comprising an image capture system configured for capturing a plurality of digital still images, wherein the means for displaying is further configured for displaying thumbnail representations of at least some of the plurality of digital still images and the means for scrolling is further configured for navigating through the thumbnail representations.

76. The digital camera of claim 12 wherein the additional information provides a plurality of items through which at least one of camera settings and image settings are manipulated.

77. The digital camera of claim 12 wherein the additional information provides a plurality of items through which image capture settings are manipulated.

78. The digital camera of claim 12 wherein each mode-specific item corresponds to a menu category and:

when the digital camera is placed into a first operating mode of the at least two operating modes, a first group of the mode-specific items associated with the first operating mode is displayed in the alignment that is mapped to the orientation of the first set of navigation buttons, and the additional information displayed for the currently active item in the first operating mode provides a list of sub-menu items for the currently active item in the first operating mode;

during scrolling through the first group of the mode-specific items in the first operating mode, the mode-specific items of the first group of the mode-specific items are scrolled-off the display and replaced by the new mode-specific items of the first group of mode-specific items; and when the digital camera is placed into a second operating mode of the at least two operating modes, a second group of the mode-specific items associated with the second operating mode is displayed in the alignment that is mapped to the orientation of the first set of navigation buttons and the additional information displayed for the currently active item in the second operating mode provides a list of sub-menu items for the currently active item in the second operating mode.

79. The digital camera of claim 78 wherein at a given time the first group of the mode-specific items of the first operating mode are being displayed and at least one of the mode-specific items of the first operating mode is not being displayed, and further comprising means for displaying first scrolling indicia configured to inform a user that not all of the mode-specific items for the first operating mode are currently being displayed.

80. The digital camera of claim 79 wherein the first scrolling indicia comprises a first arrow that points towards a first scrolling direction to indicate that scrolling in the first scrolling direction will result in the at least one mode-specific item being displayed as one of the new mode-specific items, the first scrolling direction corresponding to the first orientation.

81. The digital camera of claim 80 wherein the first arrow is displayed substantially adjacent to one of the displayed group of mode-specific items that is displayed furthest in the first scrolling direction.

82. The digital camera of claim 81 wherein when scrolling in a second direction that is opposite the first scrolling direction is not possible, the first scrolling indicia further indicates that scrolling in the second direction is not possible.

83. The digital camera of claim 82 wherein to indicate that scrolling in the second direction is not possible, the first scrolling indicia does not provide an arrow that points towards the second direction.

84. The digital camera of claim 79 wherein the first scrolling indicia comprises a first arrow that points towards a first scrolling direction and a second arrow that points towards a second scrolling direction that is opposite of the first scrolling direction, the first arrow indicating that scrolling in the first scrolling direction will result in a first of the at least one mode-specific item being displayed as one of the new mode-specific items and the second arrow indicating that scrolling in the second scrolling direction will result in a second of the at least one mode-specific item being displayed as one of the new mode-specific items, the first scrolling direction and the second scrolling direction corresponding to the first orientation.

85. The method of claim 22 wherein the digital imaging device is a digital camera.

86. The method of claim 22 wherein at a given time a displayed group of the mode-specific items in the first operating mode are being displayed and at least one of the mode-specific items for the first operating mode is not being displayed and further comprising displaying first scrolling indicia configured to inform a user that not all of the mode-specific items for the first operating mode are currently being displayed.

87. The method of claim 86 wherein the first scrolling indicia comprises a first arrow that points towards a first scrolling direction to indicate that scrolling in the first scrolling direction will result in the at least one mode-specific item being displayed as one of the new mode-specific items, the first scrolling direction corresponding to a horizontal direction.

88. The method of claim 87 wherein the first arrow is displayed substantially adjacent to one of the displayed group of mode-specific items that is displayed furthest in the first scrolling direction.

89. The method of claim 88 wherein when scrolling in a second direction that is opposite the first scrolling direction is not possible, the first scrolling indicia further indicates that scrolling in the second direction is not possible.

90. The method of claim 89 wherein to indicate that scrolling in the second direction is not possible, the first scrolling indicia does not provide an arrow that points towards the second direction.

91. The method of claim 86 wherein the first scrolling indicia comprises a first arrow that points towards a first scrolling direction and a second arrow that points towards a second scrolling direction that is opposite of the first scrolling direction, the first arrow indicating that scrolling in the first scrolling direction will result in a first of the at least one mode-specific item being displayed as one of the new mode-specific items and the second arrow indicating that scrolling in the second scrolling direction will result in a second of the at least one mode-specific item being displayed as one of the new mode-specific items, the first scrolling direction and the second scrolling direction corresponding to opposing horizontal directions.

92. The method of claim 91 wherein the first arrow is displayed substantially adjacent to one of the displayed group of mode-specific items that is displayed furthest in the first scrolling direction and the second arrow is displayed substantially adjacent to one of the displayed group of mode-specific items that is displayed furthest in the second scrolling direction.

93. The method of claim 22 wherein at a given time a displayed group of the mode-specific items in the first operating mode are being displayed and at least one of the mode-specific items for the first operating mode is not being displayed and scrolling comprises paging, wherein the displayed group of the mode-specific items is removed at one time from being displayed and the at least one of the mode-specific items is subsequently displayed as at least one of the new mode-specific items.

94. The method of claim 22 wherein as each of the mode-specific items is scrolled-off the display, one of the new mode-specific items is scrolled onto the display.

95. The method of claim 22 wherein the mode-specific items for the first operating mode are first menu categories; each of the first menu categories is associated with a list of first sub-menu items that corresponds to at least one of first settings and first features for the digital camera; and the graphics and text displayed for the activated mode-specific item on the display comprises the first sub-menu items that correspond to the activated mode-specific item.

96. The method of claim 95 wherein the mode-specific items for the second operating mode are second menu categories; each of the second menu categories is associated with a list of second sub-menu items that corresponds to at least one of second settings and second features for the digital camera; and the graphics and text displayed for the activated mode-specific item on the display comprises the second sub-menu items that correspond to the activated mode-specific item.

97. The method of claim 95 further comprising scrolling the sub-menu items by pressing the second button, wherein an activated one of the sub-menu items is indicated.

98. The method of claim 97 wherein selection of one of the sub-menu items facilitates changing the at least one of the first settings and first features that is associated with the one of the sub-menu items.

99. The method of claim 95 further comprising displaying a text label indentifying the activated mode-specific item.

100. The method of claim 22 wherein the mode-specific items are displayed as icons that represent corresponding menu categories.

101. The method of claim 22 further comprising capturing a plurality of digital still images; displaying thumbnail representations of at least some of the plurality of digital still images; and navigating through the thumbnail representations.

102. The method of claim 22 wherein the graphics and text provide a plurality of items through which at least one of camera settings and image settings are manipulated.

103. The method of claim 22 wherein the graphics and text provide a plurality of items through which image capture settings are manipulated.

\* \* \* \* \*